(12) United States Patent
Pan et al.

(10) Patent No.: US 12,271,998 B2
(45) Date of Patent: Apr. 8, 2025

(54) SPATIALLY AND TEMPORALLY CONSISTENT GROUND MODELLING WITH INFORMATION FUSION

(71) Applicant: Motional AD LLC, Boston, MA (US)

(72) Inventors: Yu Pan, Singapore (SG); Thomas Koelbaek Jespersen, Singapore (SG); Jiong Yang, Singapore (SG)

(73) Assignee: Motional AD LLC, Boston, MA (US)

( * ) Notice: Subject to any disclaimer, the term of this patent is extended or adjusted under 35 U.S.C. 154(b) by 495 days.

(21) Appl. No.: 17/483,418

(22) Filed: Sep. 23, 2021

(65) Prior Publication Data
US 2023/0089897 A1    Mar. 23, 2023

(51) Int. Cl.
*G06T 17/05* (2011.01)
*G06F 18/2415* (2023.01)
(Continued)

(52) U.S. Cl.
CPC ........ *G06T 17/05* (2013.01); *G06F 18/24155* (2023.01); *G06F 18/253* (2023.01); *G06V 20/56* (2022.01); *G08G 1/096783* (2013.01)

(58) Field of Classification Search
CPC ............. G06T 17/05; G06T 17/00; G06T 2207/30236; G06T 2207/30241;
(Continued)

(56) References Cited

U.S. PATENT DOCUMENTS

| 6,621,494 B2 * | 9/2003 | Matsuoka | G09B 29/106 |
| | | | 701/533 |
| 8,825,260 B1 * | 9/2014 | Silver | G01S 13/931 |
| | | | 342/159 |

(Continued)

FOREIGN PATENT DOCUMENTS

| CN | 110879991 A | * | 3/2020 | ......... G06K 9/00805 |
| DE | 102017201838 | | 8/2018 | |

(Continued)

OTHER PUBLICATIONS

U.S. Appl. No. 63/235,993 specification, (filed Aug. 23, 2021) drawing (Year: 2021).*

(Continued)

*Primary Examiner* — Jose L Couso
(74) *Attorney, Agent, or Firm* — Fish & Richardson P.C.

(57) ABSTRACT

Among other things, techniques are described for spatially and temporally consistent ground modelling with information fusion. A vehicle location and orientation is obtained and an instantaneous ground height estimation is obtained for anchor cells of a grid map of the vehicle based on the obtained vehicle location and orientation. A pseudo ground height associated with non-anchor cells of the grid map is computed. A Bayesian filtering framework is used to generate a final ground height estimate for the anchor cells and the non-anchor cells based on the instantaneous ground height estimation for the anchor cells, the pseudo ground height associated with non-anchor cells, an estimated ground height from a previous timestamp, or any combinations thereof. The vehicle operates according to the final ground height estimate.

20 Claims, 20 Drawing Sheets

(51) Int. Cl.
*G06F 18/25* (2023.01)
*G06V 20/56* (2022.01)
*G08G 1/0967* (2006.01)

(58) Field of Classification Search
CPC ......... G06T 2207/30252; G06T 3/4046; G06T 9/002; G06T 2207/20076; G06T 2207/20081; G06T 2207/20084; G06F 18/24155; G06F 18/253; G06V 20/56; G06V 20/588; G06V 20/58; G06V 20/64; G06V 10/454; G06V 10/54; G06V 10/774; G06V 10/82; G06V 30/18057; G08G 1/096783; G08G 1/09626; G08G 1/0112; G08G 1/0129; G08G 1/0133; G08G 1/04; G08G 1/16; G08G 1/166; G01S 17/86; G01S 17/89; G01S 13/867; G01S 15/931; G01S 2013/9316; G01S 17/931; G01S 17/42; G01S 7/4802; G01S 17/4808; G01S 17/4817; G01S 7/003; B60W 40/06; B60W 40/076; B60W 2552/15; B60W 2552/20; B60W 2552/25; B60W 2552/35; B60W 40/52; B60W 2554/4041; B60W 2556/40; B60W 2556/50; B60W 2420/52; G05D 2201/0213; G05D 1/0231; G05D 1/0251; G05D 1/0257; G05D 1/0289; G01C 21/1652; G01C 21/14; G01C 21/30; G01C 21/32; G01C 21/3446; G01C 21/3811; G01C 21/3841; G09B 29/106; G06N 3/02; G06N 3/08–088; G06N 3/0445; G06N 3/0454; G06N 3/4046; G06N 7/00; G06N 20/00; G06K 7/1482; Y10S 128/925

See application file for complete search history.

(56) References Cited

U.S. PATENT DOCUMENTS

| | | | |
|---|---|---|---|
| 9,234,618 B1* | 1/2016 | Zhu | G01S 7/497 |
| 10,444,759 B2* | 10/2019 | Douillard | G05D 1/024 |
| 10,620,638 B2* | 4/2020 | Budihal | G06T 7/11 |
| 10,984,290 B1* | 4/2021 | Goel | G06N 20/00 |
| 11,069,082 B1* | 7/2021 | Ebrahimi Afrouzi | H04N 23/56 |
| 11,274,929 B1* | 3/2022 | Afrouzi | G06T 7/62 |
| 11,668,798 B2* | 6/2023 | Kumar | G06T 11/20 701/408 |
| 2002/0038181 A1* | 3/2002 | Okude | G09B 29/10 701/458 |
| 2010/0098290 A1* | 4/2010 | Zhang | B60W 30/00 701/41 |
| 2011/0133914 A1* | 6/2011 | Griffin | G01S 17/931 348/142 |
| 2016/0221503 A1* | 8/2016 | Krökel | G06T 5/80 |
| 2016/0253566 A1* | 9/2016 | Stein | G06V 20/56 348/148 |
| 2017/0023678 A1* | 1/2017 | Pink | G01S 17/42 |
| 2017/0185089 A1* | 6/2017 | Mei | G05D 1/0257 |
| 2017/0191826 A1* | 7/2017 | Nagori | G06T 7/73 |
| 2017/0344018 A1* | 11/2017 | Song | G06N 7/01 |
| 2018/0095474 A1* | 4/2018 | Batur | G01S 13/867 |
| 2018/0364717 A1* | 12/2018 | Douillard | G01S 17/931 |
| 2019/0005667 A1* | 1/2019 | Khawaja | G06T 7/536 |
| 2019/0170511 A1 | 6/2019 | Maucher et al. | |
| 2019/0325595 A1* | 10/2019 | Stein | G06V 10/764 |
| 2020/0135014 A1* | 4/2020 | De La Guardia Gonzalez | G05D 1/0088 |
| 2020/0151942 A1* | 5/2020 | Guo | G06T 5/50 |
| 2020/0159227 A1* | 5/2020 | Cohen | G05D 1/024 |
| 2020/0166366 A1* | 5/2020 | Herman | G06V 20/56 |
| 2020/0191936 A1* | 6/2020 | Witter | G01S 13/584 |
| 2020/0211226 A1* | 7/2020 | Kundu | G06V 20/582 |
| 2020/0219316 A1* | 7/2020 | Baik | G06T 7/75 |
| 2020/0225673 A1* | 7/2020 | Ebrahimi Afrouzi | G06N 5/04 |
| 2020/0278681 A1 | 9/2020 | Gier et al. | |
| 2020/0324786 A1 | 10/2020 | Gray et al. | |
| 2020/0327690 A1* | 10/2020 | Cai | G06T 7/73 |
| 2021/0132609 A1* | 5/2021 | Herr | G01S 7/497 |
| 2021/0157321 A1 | 5/2021 | Wang et al. | |
| 2021/0165997 A1* | 6/2021 | Cai | G06T 7/73 |
| 2021/0188312 A1 | 6/2021 | Shikari et al. | |
| 2021/0358296 A1* | 11/2021 | Lee | G06T 7/246 |
| 2022/0111868 A1* | 4/2022 | Costea | G06V 20/56 |
| 2022/0165010 A1* | 5/2022 | Foley | G06T 11/60 |
| 2022/0196432 A1* | 6/2022 | Buda | G01S 17/89 |
| 2022/0207755 A1* | 6/2022 | Feng | G06V 10/751 |
| 2022/0301186 A1* | 9/2022 | Nister | G06T 7/60 |
| 2023/0030172 A1* | 2/2023 | Li | G01S 13/931 |
| 2023/0050467 A1* | 2/2023 | Govardhanam | G06T 5/50 |
| 2023/0056589 A1* | 2/2023 | Trojahner | B60W 40/09 |
| 2023/0095384 A1* | 3/2023 | Sharma Banjade | G08G 1/096725 701/301 |

FOREIGN PATENT DOCUMENTS

| | | | | |
|---|---|---|---|---|
| GB | 2552021 | 1/2018 | | |
| GB | 2571589 | 9/2019 | | |
| JP | 2012-225806 | 11/2012 | | |
| KR | 10-1822373 | 3/2018 | | |
| WO | WO-2021106196 A1 * | 6/2021 | | G06T 7/60 |
| WO | WO-2021106197 A1 * | 6/2021 | | G01S 13/584 |

OTHER PUBLICATIONS

U.S. Appl. No. 63/235,993 drawings, (filed Aug. 23, 2021) (Year: 2021).*

[No Author Listed], "Surface Vehicle Recommended Practice: Taxonomy and Definitions for Terms Related to Driving Automation Systems for On-Road Motor Vehicles," SAE International, Standard J3016, Sep. 30, 2016, 30 pages.

* cited by examiner

1300A

1400

1500A

1500B

SPATIALLY AND TEMPORALLY CONSISTENT GROUND MODELLING WITH INFORMATION FUSION

FIELD OF THE INVENTION

This description relates to spatially and temporally consistent ground modelling with information fusion.

BACKGROUND

Ground level estimation is used to estimate the ground level of a consistent location in an environment. The ground level estimate is used to describe the features associated with the surface upon which the vehicle travels. In some cases, the ground level estimate corresponds to a particular slope of the surface.

DETAILED DESCRIPTION

Figure 1:
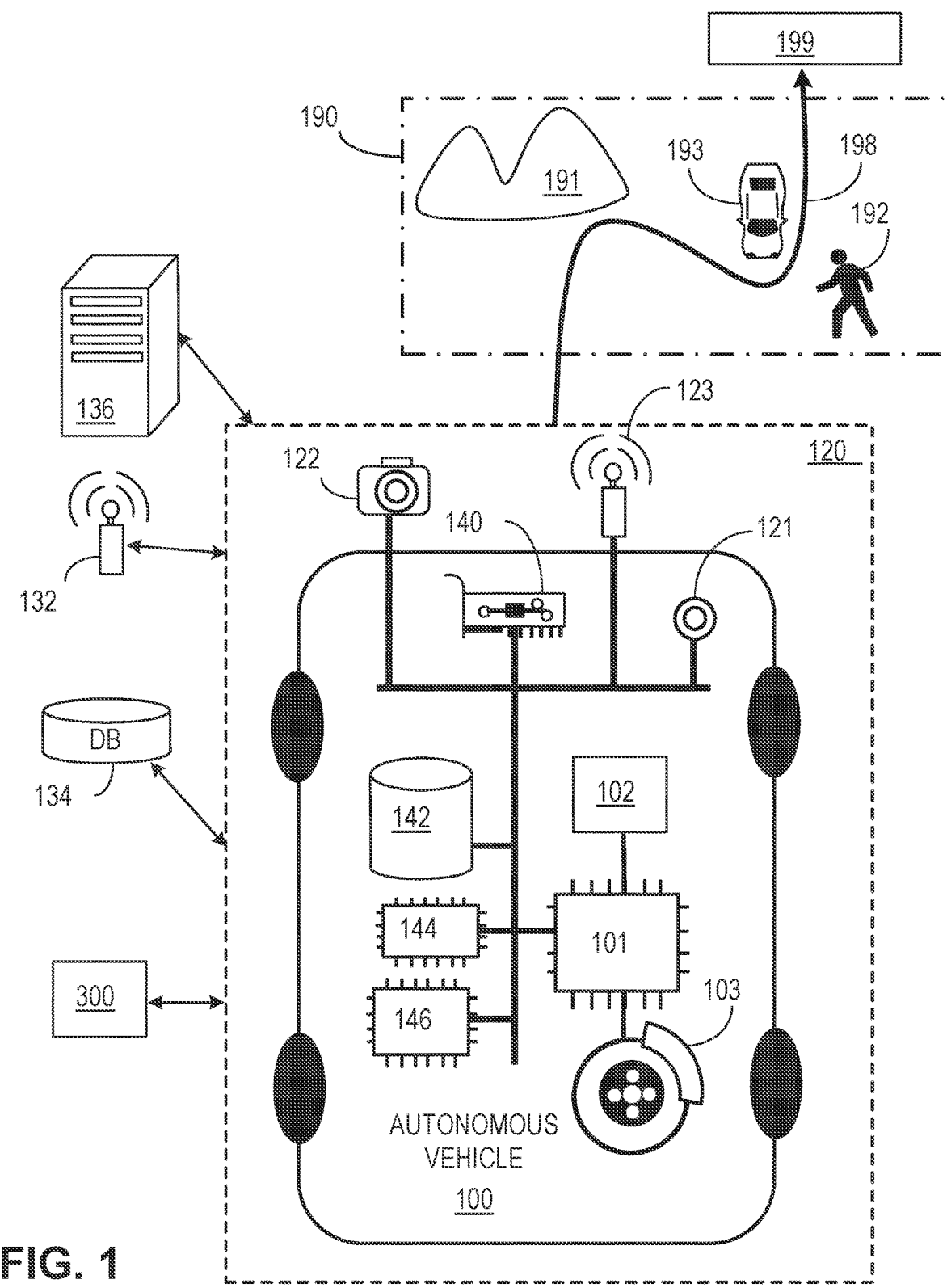
FIG. 1 shows an example of an autonomous vehicle (AV) having autonomous capability.

In the following description, for the purposes of explanation, numerous specific details are set forth in order to provide a thorough understanding of the present disclosure. It will be apparent, however, that the present disclosure can be practiced without these specific details. In other instances, well-known structures and devices are shown in block diagram form in order to avoid unnecessarily obscuring the present disclosure.

In the drawings, specific arrangements or orderings of schematic elements, such as those representing devices, modules, systems, instruction blocks, and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
    2. System Overview
    3. AV Architecture
    4. AV Inputs
    5. AV Planning
    6. AV Control
    7. Ground Modelling
    8. System for Spatially and Temporally Consistent Ground Modelling with Information Fusion
    9. Process for Spatially and Temporally Consistent Ground Modelling with Information Fusion

General Overview

A mobile robot, such as an autonomous vehicle, relies on one or more sensors to perceive the surrounding environment. Perception of the environment includes, but is not limited to, modeling the ground surface. A ground height generally refers to the height of the ground with respect to a current pose of the vehicle, where the ground is a solid surface over which the vehicle can travel. In some instances, perception of the ground height by vehicle sensors is unavailable due to occlusions or areas being beyond a range of one or more sensors. Pseudo ground height measurements are generated to produce spatially consistent ground height estimates. Several techniques for obtaining other ground height measurements can be used to generate ground models in the presence of occlusions or out of range areas. Pseudo measurements are fused with the other ground height measurements to obtain a single ground height model that is spatially and temporally consistent.

Some of the advantages of these techniques obtaining a spatially and temporally consistent ground height estimation. In particular, temporal consistency is achieved through ground height propagation over time. Additionally, the pseudo ground height measurement according to the present techniques includes information from neighboring reliable contexts, yielding a ground height model that is consistent throughout the entire modeled space. Further, the present techniques can fuse ground height information from various sources, resulting in a robust ground model in view of various occlusions and hardware limitations.

System Overview

FIG. 1 shows an example of an AV 100 having autonomous capability.

As used herein, the term "autonomous capability" refers to a function, feature, or facility that enables a vehicle to be partially or fully operated without real-time human intervention, including without limitation fully AVs, highly AVs, and conditionally AVs.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle. A lane is sometimes identified based on lane markings. For example, a lane may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area or, e.g., natural obstructions to be avoided in an undeveloped area. A lane could also be interpreted independent of lane markings or physical features. For example, a lane could be interpreted based on an arbitrary path free of obstructions in an area that otherwise lacks features that would be interpreted as lane boundaries. In an example scenario, an AV could interpret a lane through an obstruction-free portion of a field or empty lot. In another example scenario, an AV could interpret a lane through a wide (e.g., wide enough for two or more lanes) road that does not have lane markings. In this scenario, the AV could communicate information about the lane to other AVs so that the other AVs can use the same lane information to coordinate path planning among themselves.

The term "over-the-air (OTA) client" includes any AV, or any electronic device (e.g., computer, controller, IoT device, electronic control unit (ECU)) that is embedded in, coupled to, or in communication with an AV.

The term "over-the-air (OTA) update" means any update, change, deletion or addition to software, firmware, data or configuration settings, or any combination thereof, that is delivered to an OTA client using proprietary and/or standardized wireless communications technology, including but not limited to: cellular mobile communications (e.g., 2G, 3G, 4G, 5G), radio wireless area networks (e.g., WiFi) and/or satellite Internet.

The term "edge node" means one or more edge devices coupled to a network that provide a portal for communication with AVs and can communicate with other edge nodes and a cloud based computing platform, for scheduling and delivering OTA updates to OTA clients.

The term "edge device" means a device that implements an edge node and provides a physical wireless access point (AP) into enterprise or service provider (e.g., VERIZON, AT&T) core networks. Examples of edge devices include but are not limited to: computers, controllers, transmitters, routers, routing switches, integrated access devices (IADs), multiplexers, metropolitan area network (MAN) and wide area network (WAN) access devices.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 200 described below with respect to FIG. 2.

In general, this document describes technologies applicable to any vehicles that have one or more autonomous capabilities including fully AVs, highly AVs, and conditionally AVs, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially AVs and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems can automate certain vehicle operations (e.g., steering, braking, and using maps) under certain operating conditions based on processing of sensor inputs. The technologies described in this document can benefit vehicles in any levels, ranging from fully AVs to human-operated vehicles.

AVs have advantages over vehicles that require a human driver. One advantage is safety. For example, in 2016, the United States experienced 6 million automobile accidents, 2.4 million injuries, 40,000 fatalities, and 13 million vehicles in crashes, estimated at a societal cost of $910+ billion. U.S. traffic fatalities per 100 million miles traveled have been reduced from about six to about one from 1965 to 2015, in part due to additional safety measures deployed in vehicles. For example, an additional half second of warning that a crash is about to occur is believed to mitigate 60% of front-to-rear crashes. However, passive safety features (e.g., seat belts, airbags) have likely reached their limit in improving this number. Thus, active safety measures, such as automated control of a vehicle, are the likely next step in improving these statistics. Because human drivers are believed to be responsible for a critical pre-crash event in 95% of crashes, automated driving systems are likely to achieve better safety outcomes, e.g., by reliably recognizing and avoiding critical situations better than humans; making better decisions, obeying traffic laws, and predicting future events better than humans; and reliably controlling a vehicle better than a human.

Referring to FIG. 1, an AV system 120 operates the vehicle 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. We use the term "operational command" to mean an executable instruction (or set of instructions) that causes a vehicle to perform an action (e.g., a driving maneuver). Operational commands can, without limitation, including instructions for a vehicle to start moving forward, stop moving forward, start moving backward, stop moving backward, accelerate, decelerate, perform a left turn, and perform a right turn. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the vehicle 100, such as the AV's position, linear and angular velocity and acceleration, and heading (e.g., an orientation of the leading end of vehicle 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LIDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the vehicle 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the vehicle 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among AVs.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication devices 140 transmit data collected from sensors 121 or other data related to the operation of vehicle 100 to the remotely located database 134. In an embodiment, communication devices 140 transmit information that relates to teleoperations to the vehicle 100. In some embodiments, the vehicle 100 communicates with other remote (e.g., "cloud") servers 136.

In an embodiment, the remotely located database 134 also stores and transmits digital data (e.g., storing data such as road and street locations). Such data is stored on the memory 144 on the vehicle 100, or transmitted to the vehicle 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data can be stored on the memory 144 on the vehicle 100, or transmitted to the vehicle 100 via a communications channel from the remotely located database 134.

Computer processors 146 located on the vehicle 100 algorithmically generate control actions based on both real-time sensor data and prior information, allowing the AV system 120 to execute its autonomous driving capabilities.

In an embodiment, the AV system 120 includes computer peripherals 132 coupled to computer processors 146 for providing information and alerts to, and receiving input from, a user (e.g., an occupant or a remote user) of the vehicle 100. In an embodiment, peripherals 132 are similar to the display 312, input device 314, and cursor controller 316 discussed below in reference to FIG. 3. The coupling is wireless or wired. Any two or more of the interface devices can be integrated into a single device.

In an embodiment, the AV system 120 receives and enforces a privacy level of a passenger, e.g., specified by the passenger or stored in a profile associated with the passenger. The privacy level of the passenger determines how particular information associated with the passenger (e.g., passenger comfort data, biometric data, etc.) is permitted to be used, stored in the passenger profile, and/or stored on the cloud server 136 and associated with the passenger profile. In an embodiment, the privacy level specifies particular information associated with a passenger that is deleted once the ride is completed. In an embodiment, the privacy level specifies particular information associated with a passenger and identifies one or more entities that are authorized to access the information. Examples of specified entities that are authorized to access information can include other AVs, third party AV systems, or any entity that could potentially access the information.

A privacy level of a passenger can be specified at one or more levels of granularity. In an embodiment, a privacy level identifies specific information to be stored or shared. In an embodiment, the privacy level applies to all the information associated with the passenger such that the passenger can specify that none of her personal information is stored or shared. Specification of the entities that are permitted to access particular information can also be specified at various levels of granularity. Various sets of entities that are permitted to access particular information can include, for example, other AVs, cloud servers 136, specific third party AV systems, etc.

In an embodiment, the AV system 120 or the cloud server 136 determines if certain information associated with a passenger can be accessed by the AV 100 or another entity. For example, a third-party AV system that attempts to access passenger input related to a particular spatiotemporal location must obtain authorization, e.g., from the AV system 120 or the cloud server 136, to access the information associated with the passenger. For example, the AV system 120 uses the passenger's specified privacy level to determine whether the passenger input related to the spatiotemporal location can be presented to the third-party AV system, the AV 100, or to another AV. This enables the passenger's privacy level to specify which other entities are allowed to receive data about the passenger's actions or other data associated with the passenger.

Figure 2:
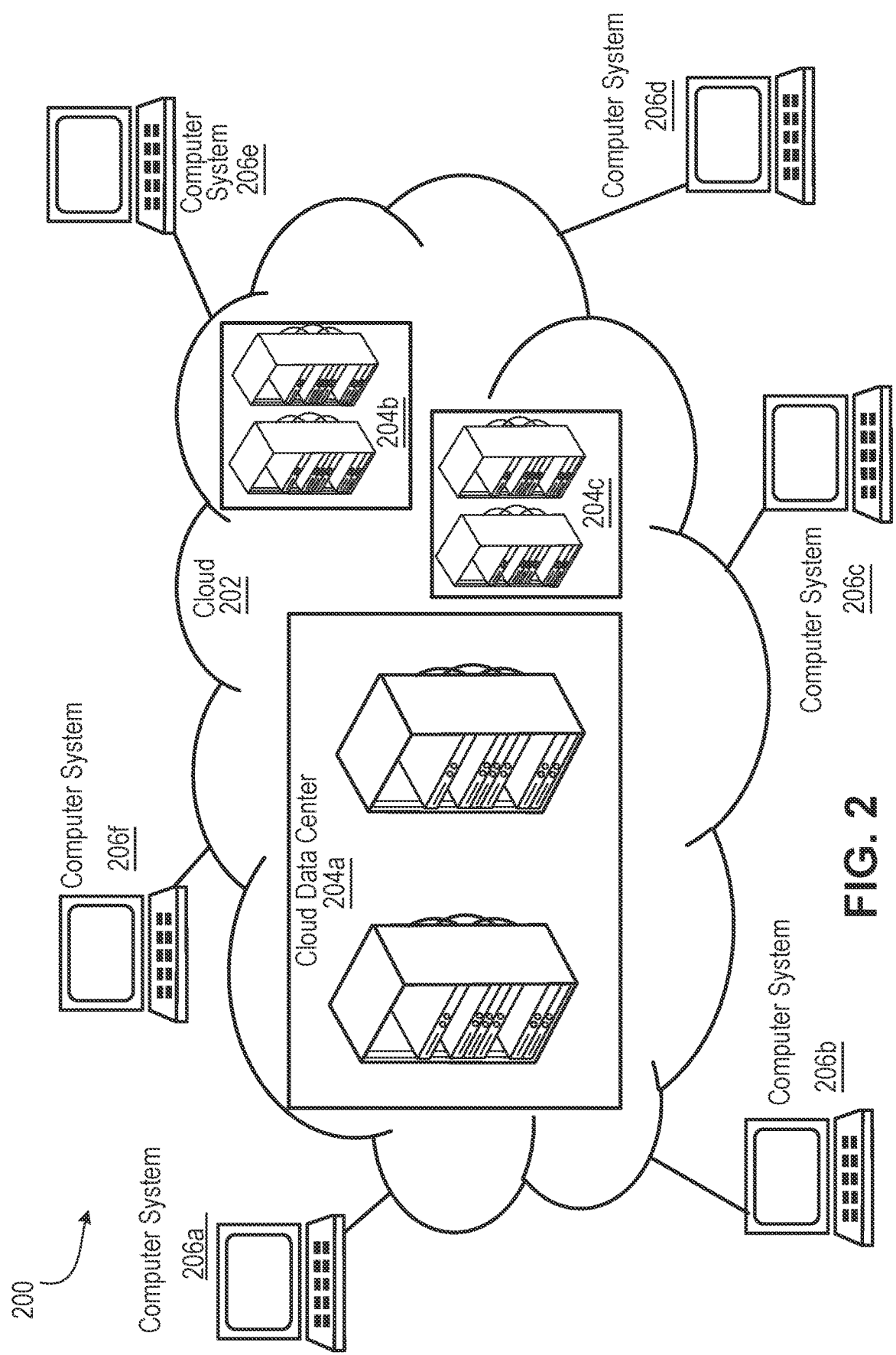
FIG. 2 shows an example "cloud" computing environment.

FIG. 2 shows an example "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, AVs (including, cars, drones, shuttles, trains, buses, etc.) and consumer electronics. In an embodiment, the computing systems 206a-f are implemented in or as a part of other systems.

Figure 3:
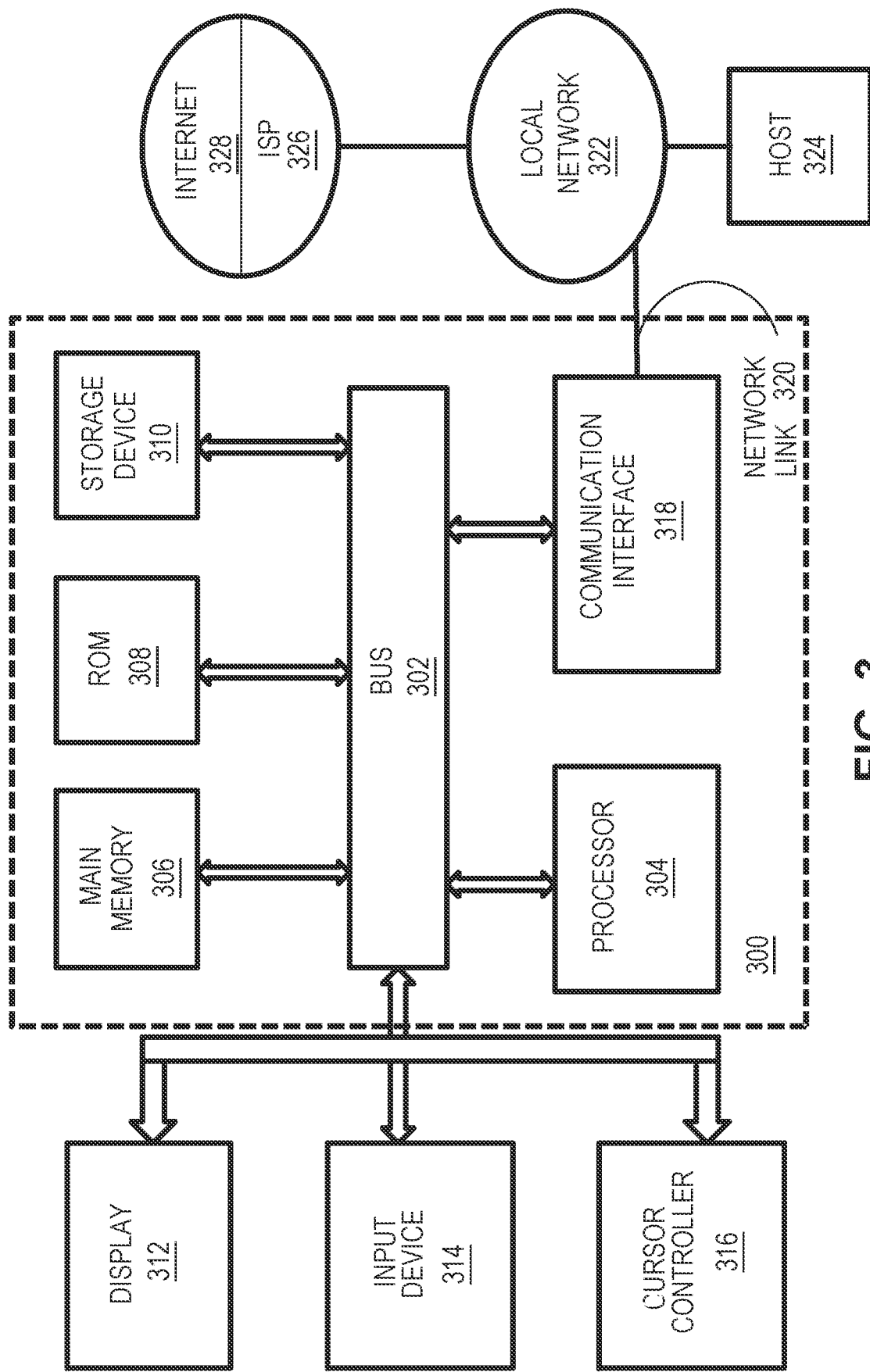
FIG. 3 shows a computer system.

FIG. 3 shows a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or can include one or more general purpose hardware processors programmed to perform the techniques pursuant to program instructions in firmware, memory, other storage, or a combination. Such special-purpose computing devices can also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a processor 304 coupled with a bus 302 for processing information. The processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 can optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

AV Architecture

Figure 4:
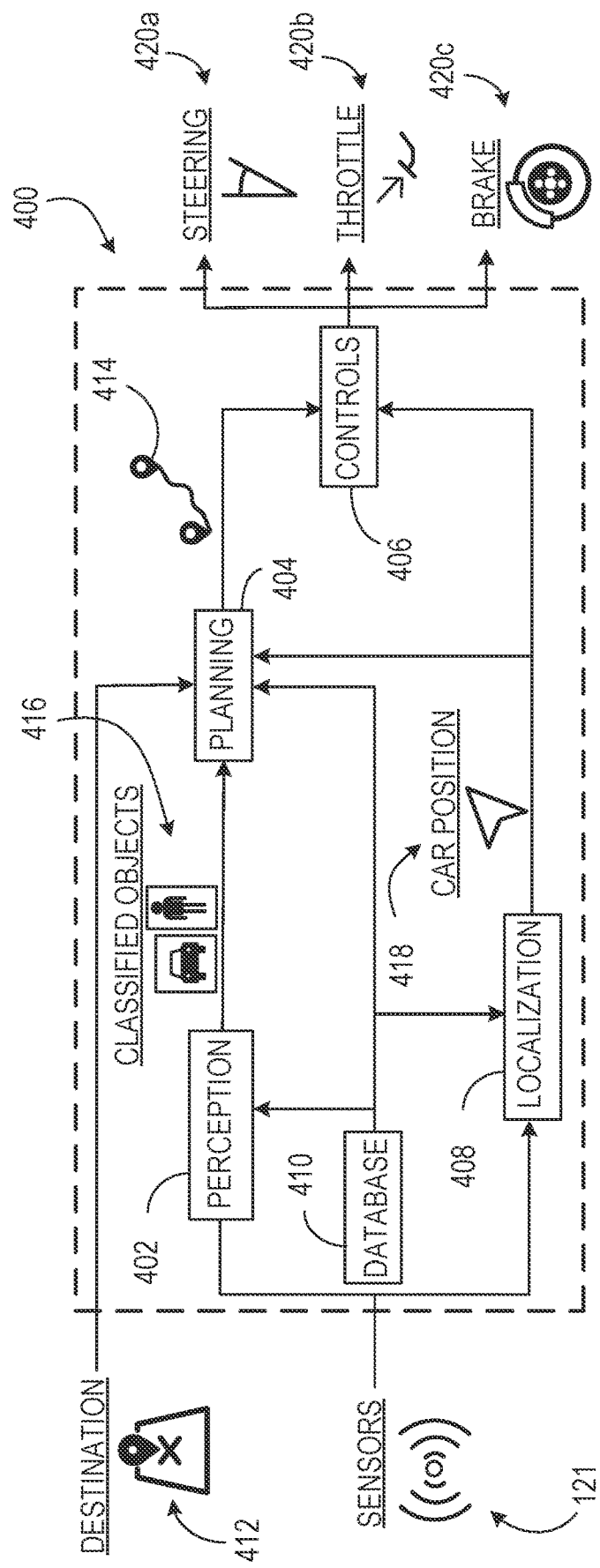
FIG. 4 shows an example architecture for an AV.

FIG. 4 shows an example architecture 400 for an AV (e.g., the vehicle 100 shown in FIG. 1). The architecture 400 includes a perception system 402 (sometimes referred to as a perception circuit), a planning system 404 (sometimes referred to as a planning circuit), a control system 406 (sometimes referred to as a control circuit), a localization system 408 (sometimes referred to as a localization circuit), and a database system 410 (sometimes referred to as a database circuit). Each system plays a role in the operation of the vehicle 100. Together, the systems 402, 404, 406, 408, and 410 can be part of the AV system 120 shown in FIG. 1. In some embodiments, any of the systems 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things). Each of the systems 402, 404, 406, 408, and 410 is sometimes referred to as a processing circuit (e.g., computer hardware, computer software, or a combination of the two). A combination of any or all of the systems 402, 404, 406, 408, and 410 is also an example of a processing circuit.

In use, the planning system 404 receives data representing a destination 412 and determines data representing a trajectory 414 (sometimes referred to as a route) that can be traveled by the vehicle 100 to reach (e.g., arrive at) the destination 412. In order for the planning system 404 to determine the data representing the trajectory 414, the planning system 404 receives data from the perception system 402, the localization system 408, and the database system 410.

The perception system 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning system 404.

The planning system 404 also receives data representing the AV position 418 from the localization system 408. The localization system 408 determines the AV position by using data from the sensors 121 and data from the database system 410 (e.g., a geographic data) to calculate a position. For example, the localization system 408 uses data from a GNSS (Global Navigation Satellite System) sensor and geographic data to calculate a longitude and latitude of the AV. In an embodiment, data used by the localization system 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types. In an embodiment, the high-precision maps are constructed by adding data through automatic or manual annotation to low-precision maps.

The control system 406 receives the data representing the trajectory 414 and the data representing the AV position 418 and operates the control functions 420a-c (e.g., steering, throttling, braking, ignition) of the AV in a manner that will cause the vehicle 100 to travel the trajectory 414 to the destination 412. For example, if the trajectory 414 includes a left turn, the control system 406 will operate the control functions 420a-c in a manner such that the steering angle of the steering function will cause the vehicle 100 to turn left and the throttling and braking will cause the vehicle 100 to pause and wait for passing pedestrians or vehicles before the turn is made.

AV Inputs

Figure 5:
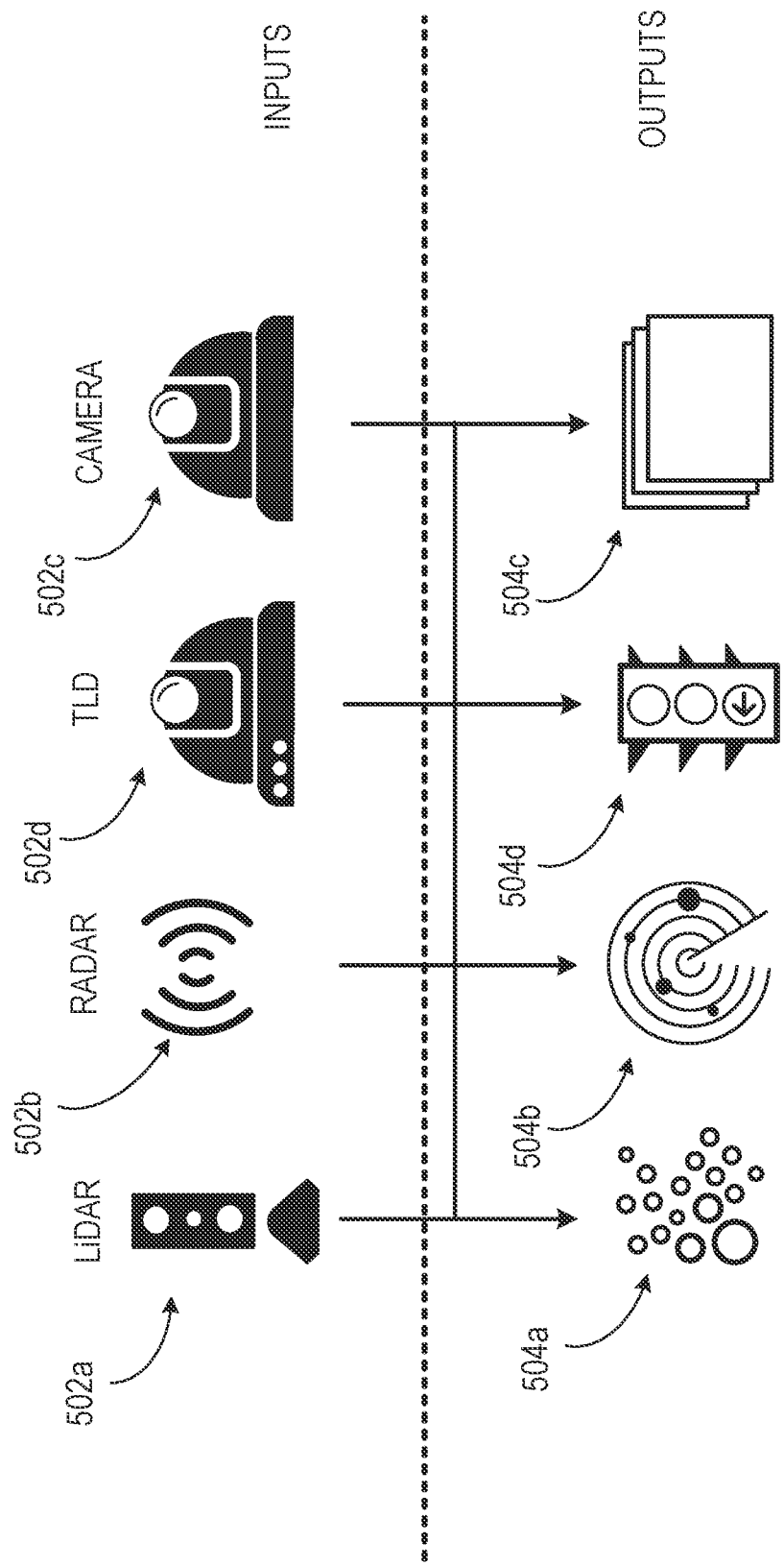
FIG. 5 shows an example of inputs and outputs that can be used by a perception system.

FIG. 5 shows an example of inputs 502a-d (e.g., sensors 121 shown in FIG. 1) and outputs 504a-d (e.g., sensor data) that is used by the perception system 402 (FIG. 4). One input 502a is a LIDAR (Light Detection and Ranging) system (e.g., LIDAR 123 shown in FIG. 1). LIDAR is a technology that uses light (e.g., bursts of light such as infrared light) to obtain data about physical objects in its line of sight. A LIDAR system produces LIDAR data as output 504a. For example, LIDAR data is collections of 3D or 2D points (also known as a point clouds) that are used to construct a representation of the environment 190.

Another input 502b is a RADAR system. RADAR is a technology that uses radio waves to obtain data about nearby physical objects. RADARs can obtain data about objects not within the line of sight of a LIDAR system. A RADAR system produces RADAR data as output 504b. For example, RADAR data are one or more radio frequency electromagnetic signals that are used to construct a representation of the environment 190.

Another input 502c is a camera system. A camera system uses one or more cameras (e.g., digital cameras using a light sensor such as a charge-coupled device [CCD]) to obtain information about nearby physical objects. A camera system produces camera data as output 504c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In some embodiments, the camera system is configured to "see" objects far, e.g., up to a kilometer or more ahead of the AV. Accordingly, in some embodiments, the camera system has features such as sensors and lenses that are optimized for perceiving objects that are far away.

Another input 502d is a traffic light detection (TLD) system. A TLD system uses one or more cameras to obtain information about traffic lights, street signs, and other physical objects that provide visual navigation information. A TLD system produces TLD data as output 504d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the vehicle 100 has access to all relevant navigation information provided by these objects. For example, the viewing angle of the TLD system is about 120 degrees or more.

In some embodiments, outputs 504a-d are combined using a sensor fusion technique. Thus, either the individual outputs 504a-d are provided to other systems of the vehicle 100 (e.g., provided to a planning system 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

Figure 6:
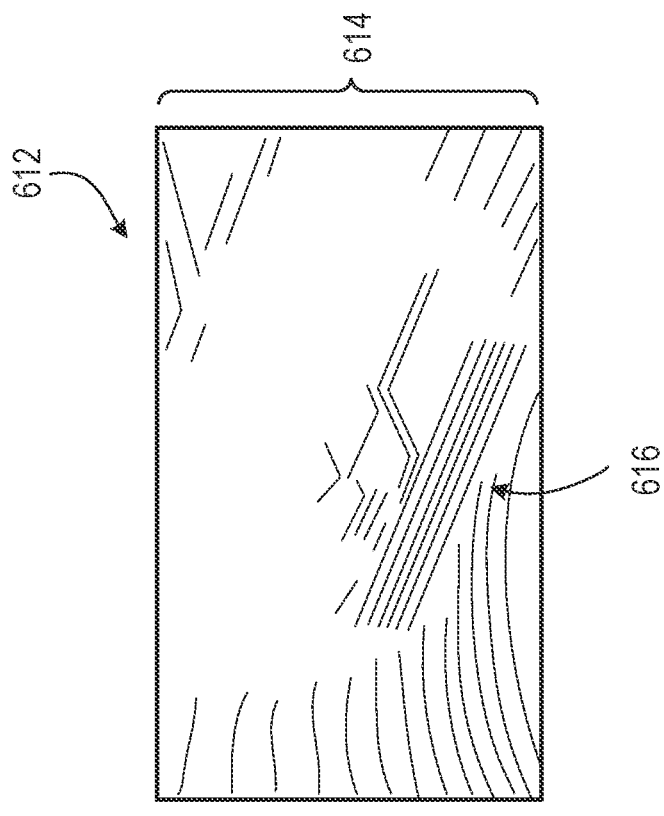
FIG. 6 shows an example of a LIDAR system.
Figure 6:
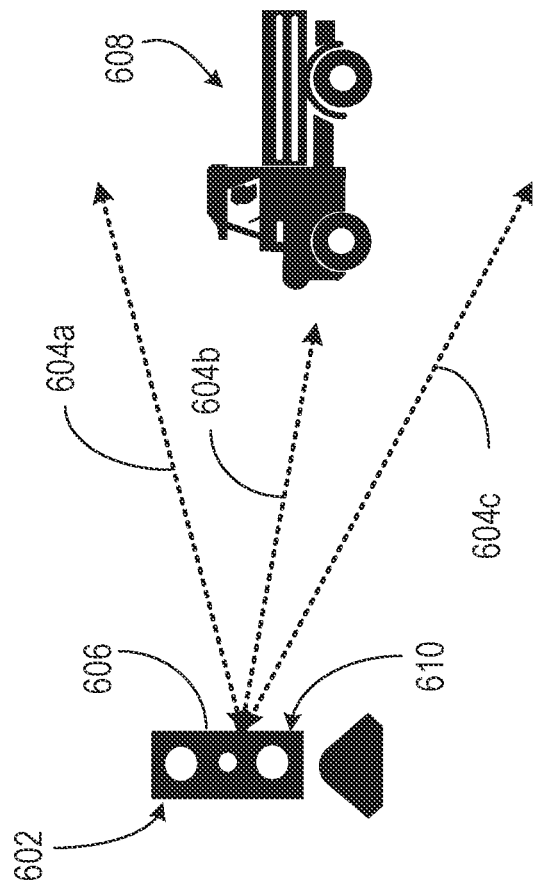

FIG. 6 shows an example of a LIDAR system 602 (e.g., the input 502a shown in FIG. 5). The LIDAR system 602 emits light 604a-c from a light emitter 606 (e.g., a laser transmitter). Light emitted by a LIDAR system is typically not in the visible spectrum; for example, infrared light is often used. Some of the light 604b emitted encounters a physical object 608 (e.g., a vehicle) and reflects back to the LIDAR system 602. (Light emitted from a LIDAR system typically does not penetrate physical objects, e.g., physical objects in solid form.) The LIDAR system 602 also has one or more light detectors 610, which detect the reflected light. In an embodiment, one or more data processing systems associated with the LIDAR system generates an image 612 representing the field of view 614 of the LIDAR system. The image 612 includes information that represents the boundaries 616 of a physical object 608. In this way, the image 612 is used to determine the boundaries 616 of one or more physical objects near an AV.

Figure 7:
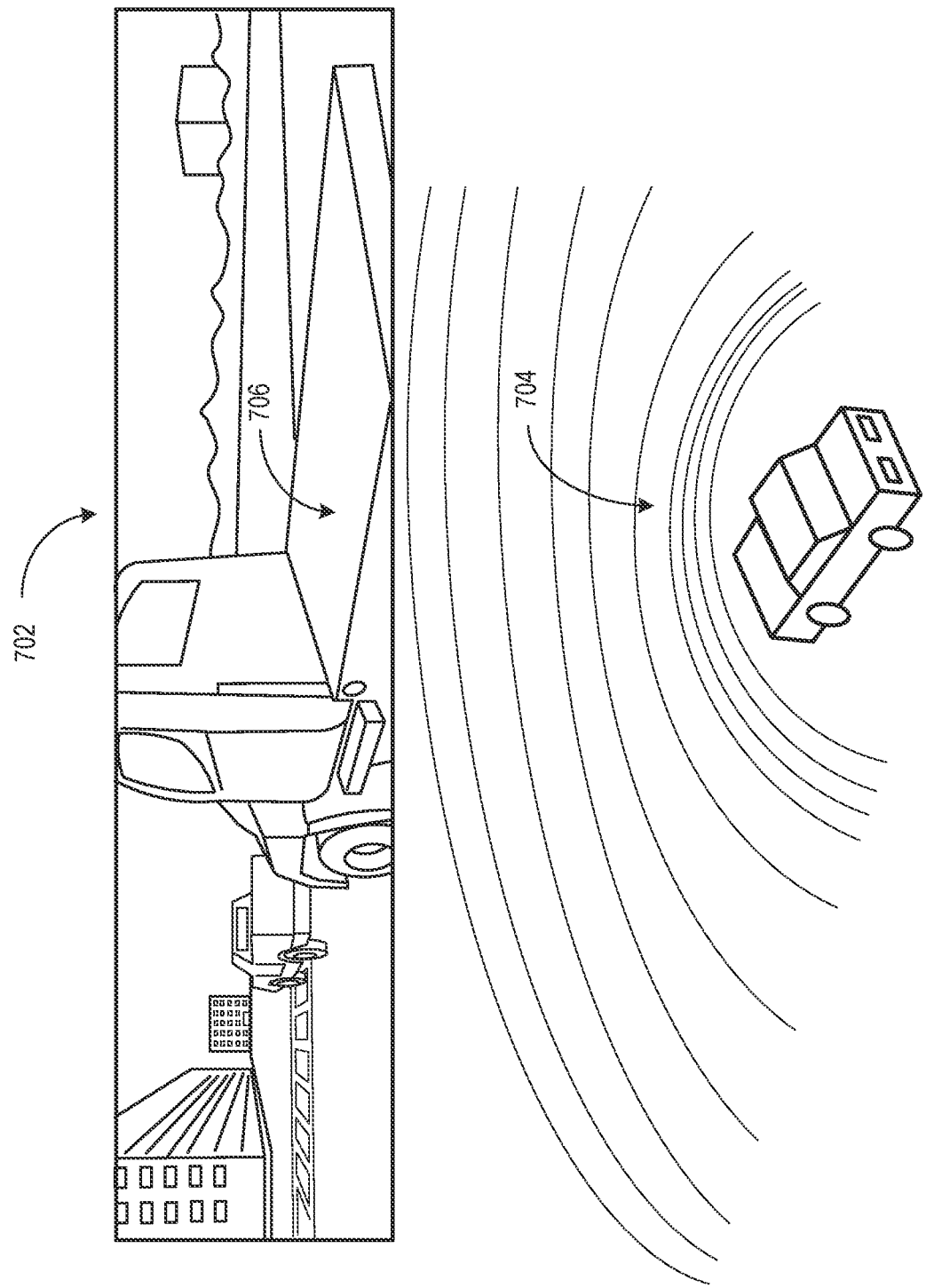
FIG. 7 shows the LIDAR system in operation.

FIG. 7 shows the LIDAR system 602 in operation. In the scenario shown in this figure, the vehicle 100 receives both camera system output 504c in the form of an image 702 and LIDAR system output 504a in the form of LIDAR data points 704. In use, the data processing systems of the vehicle 100 compares the image 702 to the data points 704. In particular, a physical object 706 identified in the image 702 is also identified among the data points 704. In this way, the vehicle 100 perceives the boundaries of the physical object based on the contour and density of the data points 704.

Figure 8:
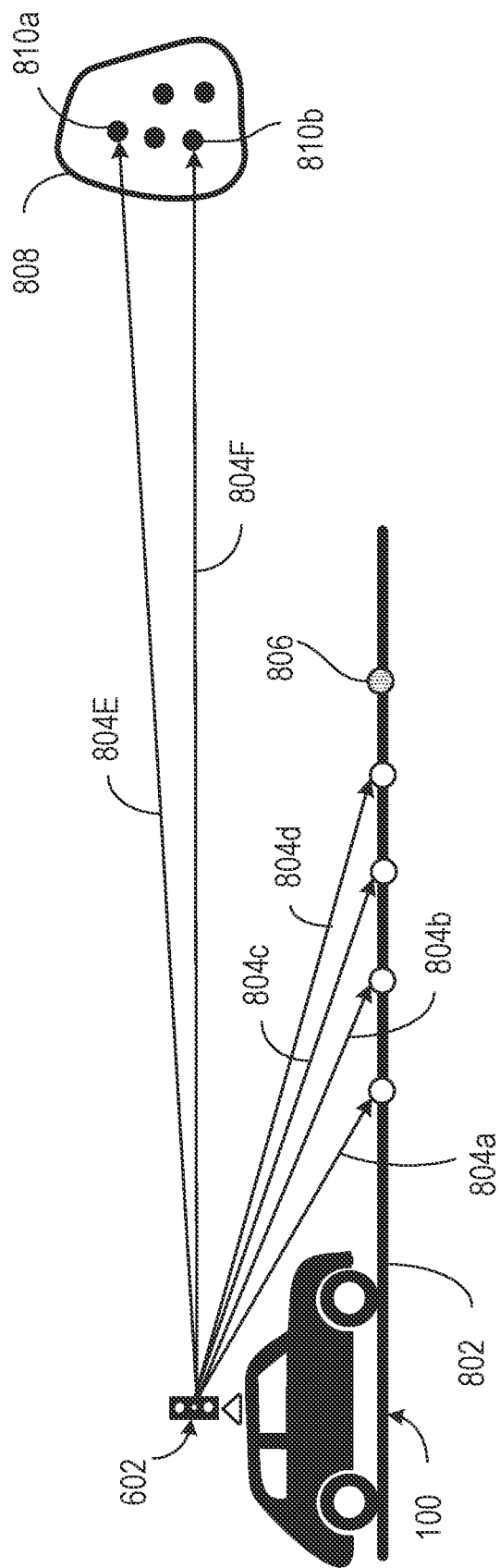
FIG. 8 shows the operation of the LIDAR system in additional detail.

FIG. 8 shows the operation of the LIDAR system 602 in additional detail. As described above, the vehicle 100 detects the boundary of a physical object based on characteristics of the data points detected by the LIDAR system 602. As shown in FIG. 8, a flat object, such as the ground 802, will reflect light 804a-d emitted from a LIDAR system 602 in a consistent manner. Put another way, because the LIDAR system 602 emits light using consistent spacing, the ground 802 will reflect light back to the LIDAR system 602 with the same consistent spacing. As the vehicle 100 travels over the ground 802, the LIDAR system 602 will continue to detect light reflected by the next valid ground point 806 if nothing is obstructing the road. However, if an object 808 obstructs the road, light 804e-f emitted by the LIDAR system 602 will be reflected from points 810a-b in a manner inconsistent with the expected consistent manner. From this information, the vehicle 100 can determine that the object 808 is present.

Path Planning

Figure 9:
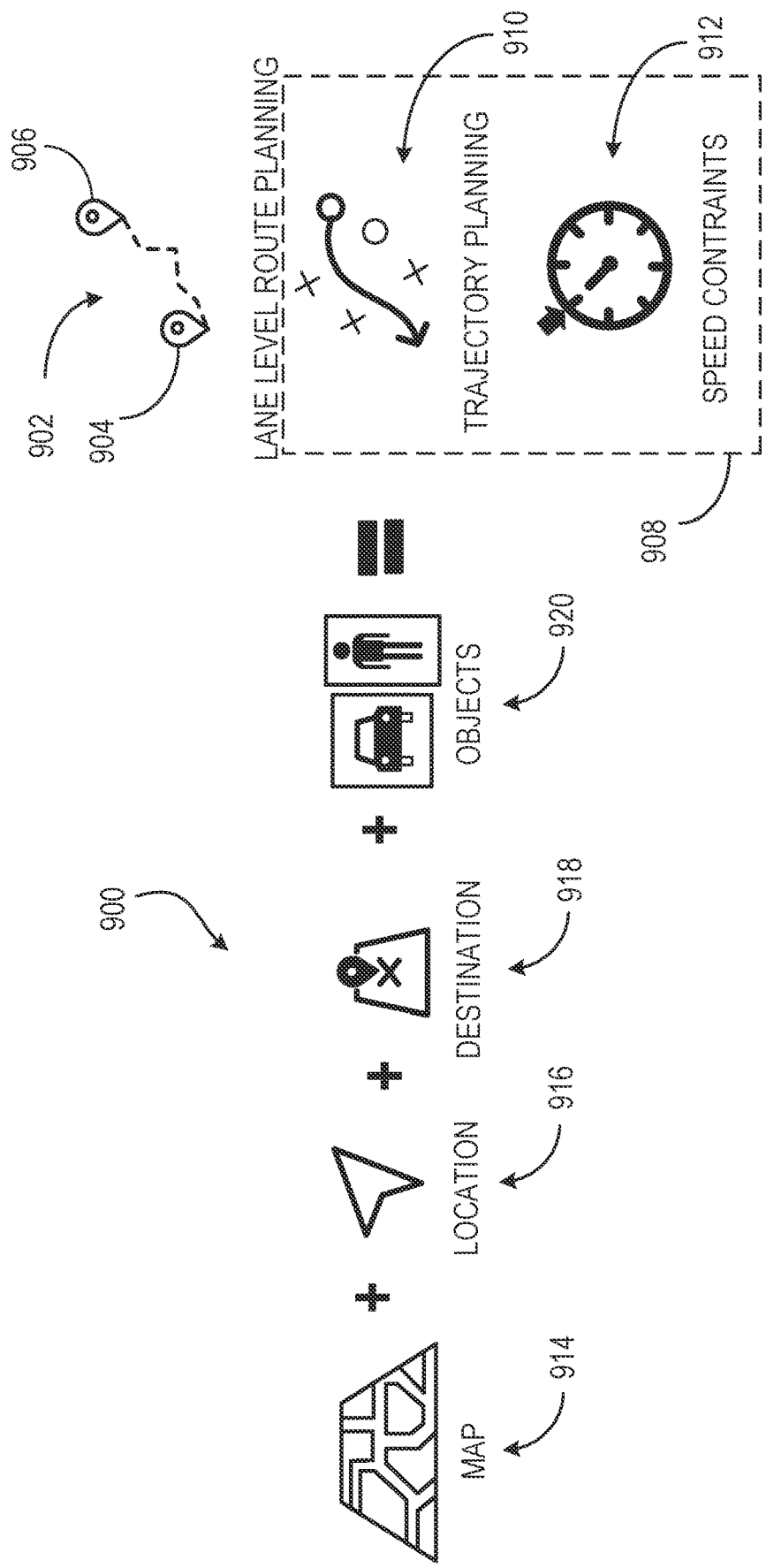
FIG. 9 shows a block diagram of the relationships between inputs and outputs of a planning system.

FIG. 9 shows a block diagram 900 of the relationships between inputs and outputs of a planning system 404 (e.g., as shown in FIG. 4). In general, the output of a planning system 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the vehicle 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning system also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the vehicle 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or unexpected traffic, the speed constraints 912 may limit the vehicle 100 to a travel speed slower than an expected speed, e.g., a speed based on speed limit data for the segment.

In an embodiment, the inputs to the planning system 404 includes database data 914 (e.g., from the database system 410 shown in FIG. 4), current location data 916 (e.g., the AV position 418 shown in FIG. 4), destination data 918 (e.g., for the destination 412 shown in FIG. 4), and object data 920 (e.g., the classified objects 416 as perceived by the perception system 402 as shown in FIG. 4). In some embodiments, the database data 914 includes rules used in planning. Rules are specified using a formal language, e.g., using Boolean logic. In any given situation encountered by the vehicle 100, at least some of the rules will apply to the situation. A rule applies to a given situation if the rule has conditions that are met based on information available to the vehicle 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
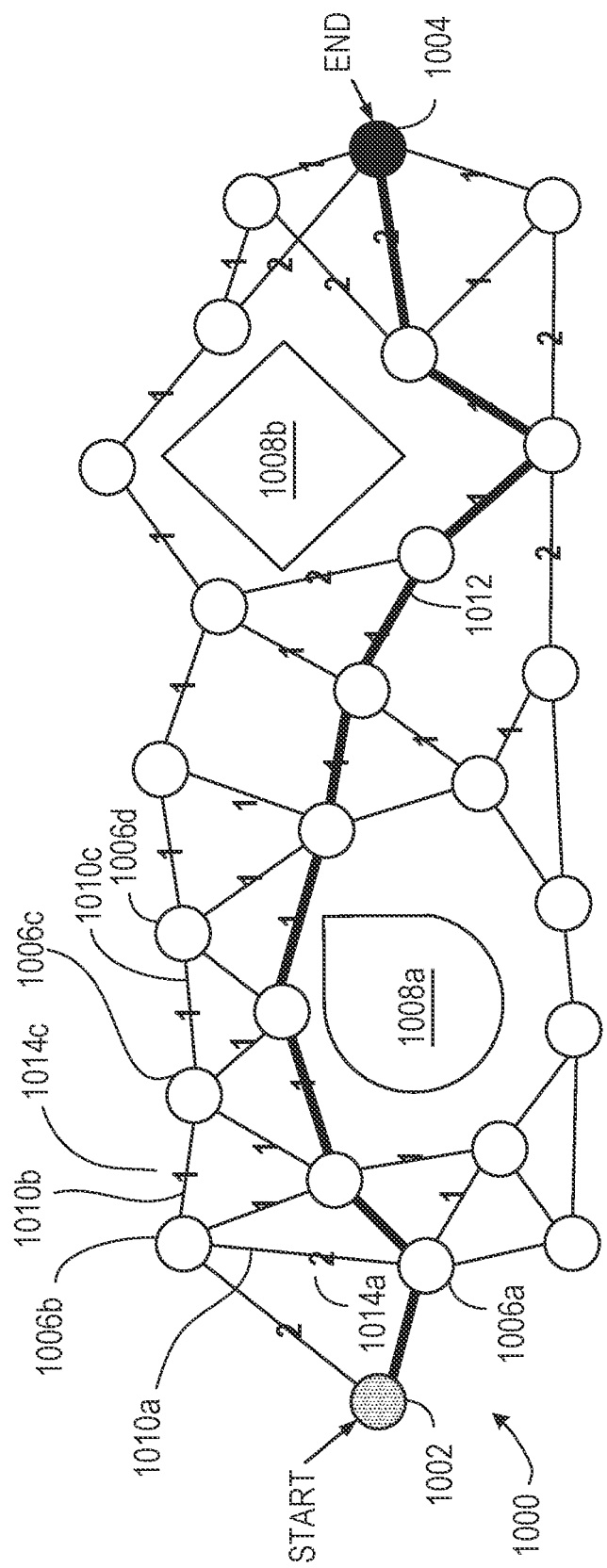
FIG. 10 shows a directed graph used in path planning.

FIG. 10 shows a directed graph 1000 used in path planning, e.g., by the planning system 404 (FIG. 4). In general, a directed graph 1000 like the one shown in FIG. 10 is used to determine a path between any start point 1002 and end point 1004. In real-world terms, the distance separating the start point 1002 and end point 1004 may be relatively large (e.g., in two different metropolitan areas) or may be relatively small (e.g., two intersections abutting a city block or two lanes of a multi-lane road).

In an embodiment, the directed graph 1000 has nodes 1006a-d representing different locations between the start point 1002 and the end point 1004 that could be occupied by a vehicle 100. In some examples, e.g., when the start point 1002 and end point 1004 represent different metropolitan areas, the nodes 1006a-d represent segments of roads. In some examples, e.g., when the start point 1002 and the end point 1004 represent different locations on the same road, the nodes 1006a-d represent different positions on that road. In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information at a low granularity and is based on stored data, but also includes some high granularity information for the portion of the graph that represents physical locations in the field of view of the vehicle 100.

The nodes 1006a-d are distinct from objects 1008a-b which cannot overlap with a node. In an embodiment, when granularity is low, the objects 1008a-b represent regions that cannot be traversed by automobile, e.g., areas that have no streets or roads. When granularity is high, the objects 1008a-b represent physical objects in the field of view of the vehicle 100, e.g., other automobiles, pedestrians, or other entities with which the vehicle 100 cannot share physical space. In an embodiment, some or all of the objects 1008a-b are a static objects (e.g., an object that does not change position such as a street lamp or utility pole) or dynamic objects (e.g., an object that is capable of changing position such as a pedestrian or other car).

The nodes 1006a-d are connected by edges 1010a-c. If two nodes 1006a-b are connected by an edge 1010a, it is possible for a vehicle 100 to travel between one node 1006a and the other node 1006b, e.g., without having to travel to an intermediate node before arriving at the other node 1006b. (When we refer to a vehicle 100 traveling between nodes, we mean that the vehicle 100 travels between the two physical positions represented by the respective nodes.) The edges 1010a-c are often bidirectional, in the sense that a vehicle 100 travels from a first node to a second node, or from the second node to the first node. In an embodiment, edges 1010a-c are unidirectional, in the sense that an vehicle 100 can travel from a first node to a second node, however the vehicle 100 cannot travel from the second node to the first node. Edges 1010a-c are unidirectional when they represent, for example, one-way streets, individual lanes of a street, road, or highway, or other features that can only be traversed in one direction due to legal or physical constraints.

In an embodiment, the planning system 404 uses the directed graph 1000 to identify a path 1012 made up of nodes and edges between the start point 1002 and end point 1004.

An edge 1010a-c has an associated cost 1014a-b. The cost 1014a-b is a value that represents the resources that will be expended if the vehicle 100 chooses that edge. A typical resource is time. For example, if one edge 1010a represents a physical distance that is twice that as another edge 1010b, then the associated cost 1014a of the first edge 1010a may be twice the associated cost 1014b of the second edge 1010b. Other factors that affect time include expected traffic, number of intersections, speed limit, etc. Another typical resource is fuel economy. Two edges 1010a-b may represent the same physical distance, but one edge 1010a may require more fuel than another edge 1010b, e.g., because of road conditions, expected weather, etc.

When the planning system 404 identifies a path 1012 between the start point 1002 and end point 1004, the planning system 404 typically chooses a path optimized for cost, e.g., the path that has the least total cost when the individual costs of the edges are added together.

AV Control

Figure 11:
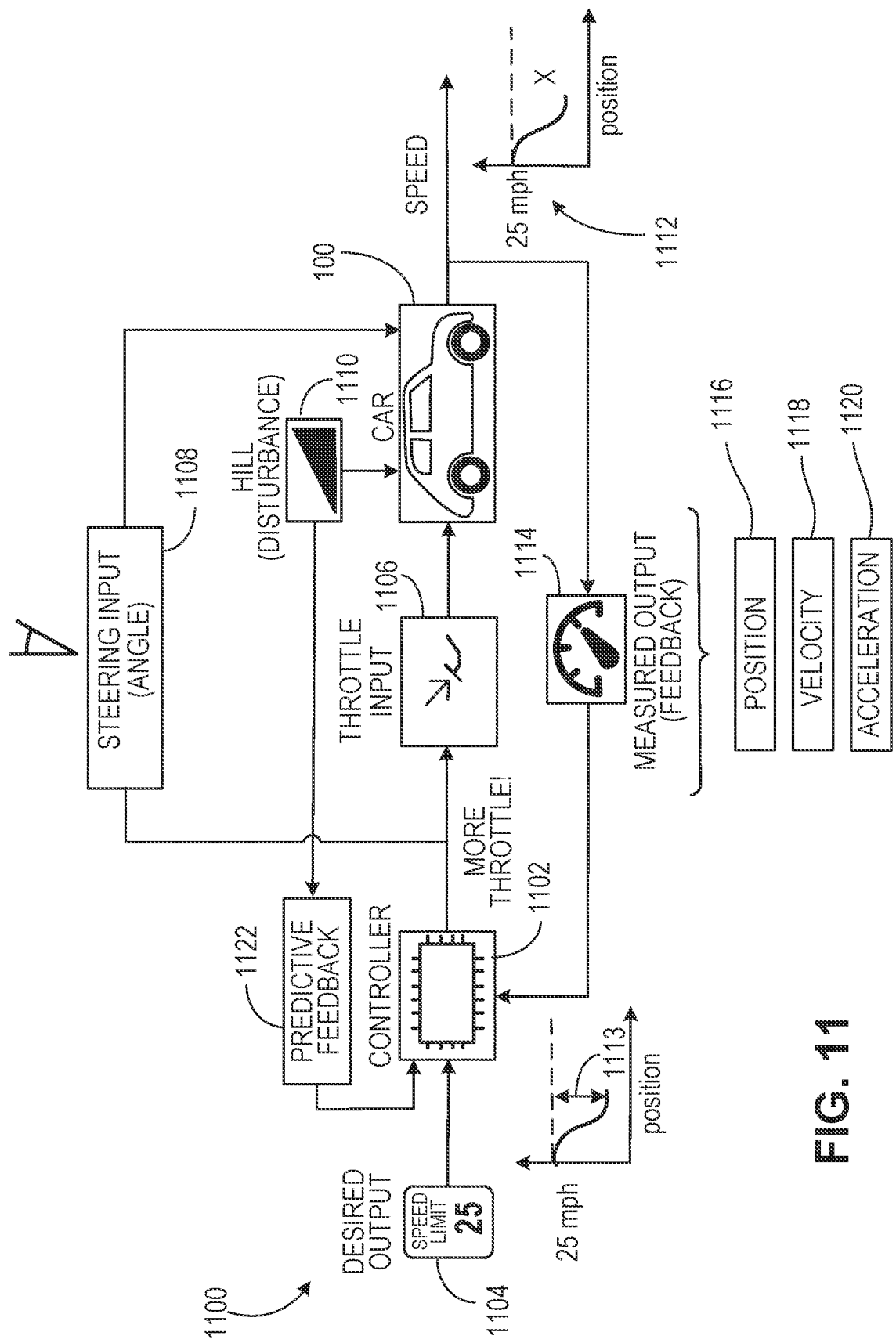
FIG. 11 shows a block diagram of the inputs and outputs of a control system.

FIG. 11 shows a block diagram 1100 of the inputs and outputs of a control system 406 (e.g., as shown in FIG. 4). A control system operates in accordance with a controller 1102 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 308, and storage device 310, and instructions stored in memory that carry out operations of the controller 1102 when the instructions are executed (e.g., by the one or more processors).

In an embodiment, the controller 1102 receives data representing a desired output 1104. The desired output 1104 typically includes a velocity, e.g., a speed and a heading. The desired output 1104 can be based on, for example, data received from a planning system 404 (e.g., as shown in FIG. 4). In accordance with the desired output 1104, the controller 1102 produces data usable as a throttle input 1106 and a steering input 1108. The throttle input 1106 represents the magnitude in which to engage the throttle (e.g., acceleration control) of an vehicle 100, e.g., by engaging the steering pedal, or engaging another throttle control, to achieve the desired output 1104. In some examples, the throttle input 1106 also includes data usable to engage the brake (e.g., deceleration control) of the vehicle 100. The steering input 1108 represents a steering angle, e.g., the angle at which the steering control (e.g., steering wheel, steering angle actuator, or other functionality for controlling steering angle) of the AV should be positioned to achieve the desired output 1104.

In an embodiment, the controller 1102 receives feedback that is used in adjusting the inputs provided to the throttle and steering. For example, if the vehicle 100 encounters a disturbance 1110, such as a hill, the measured speed 1112 of the vehicle 100 is lowered below the desired output speed. In an embodiment, any measured output 1114 is provided to the controller 1102 so that the necessary adjustments are performed, e.g., based on the differential 1113 between the measured speed and desired output. The measured output 1114 includes a measured position 1116, a measured velocity 1118 (including speed and heading), a measured acceleration 1120, and other outputs measurable by sensors of the vehicle 100.

In an embodiment, information about the disturbance 1110 is detected in advance, e.g., by a sensor such as a camera or LIDAR sensor, and provided to a predictive feedback system 1122. The predictive feedback system 1122 then provides information to the controller 1102 that the controller 1102 can use to adjust accordingly. For example, if the sensors of the vehicle 100 detect ("see") a hill, this information can be used by the controller 1102 to prepare to engage the throttle at the appropriate time to avoid significant deceleration.

Figure 12:
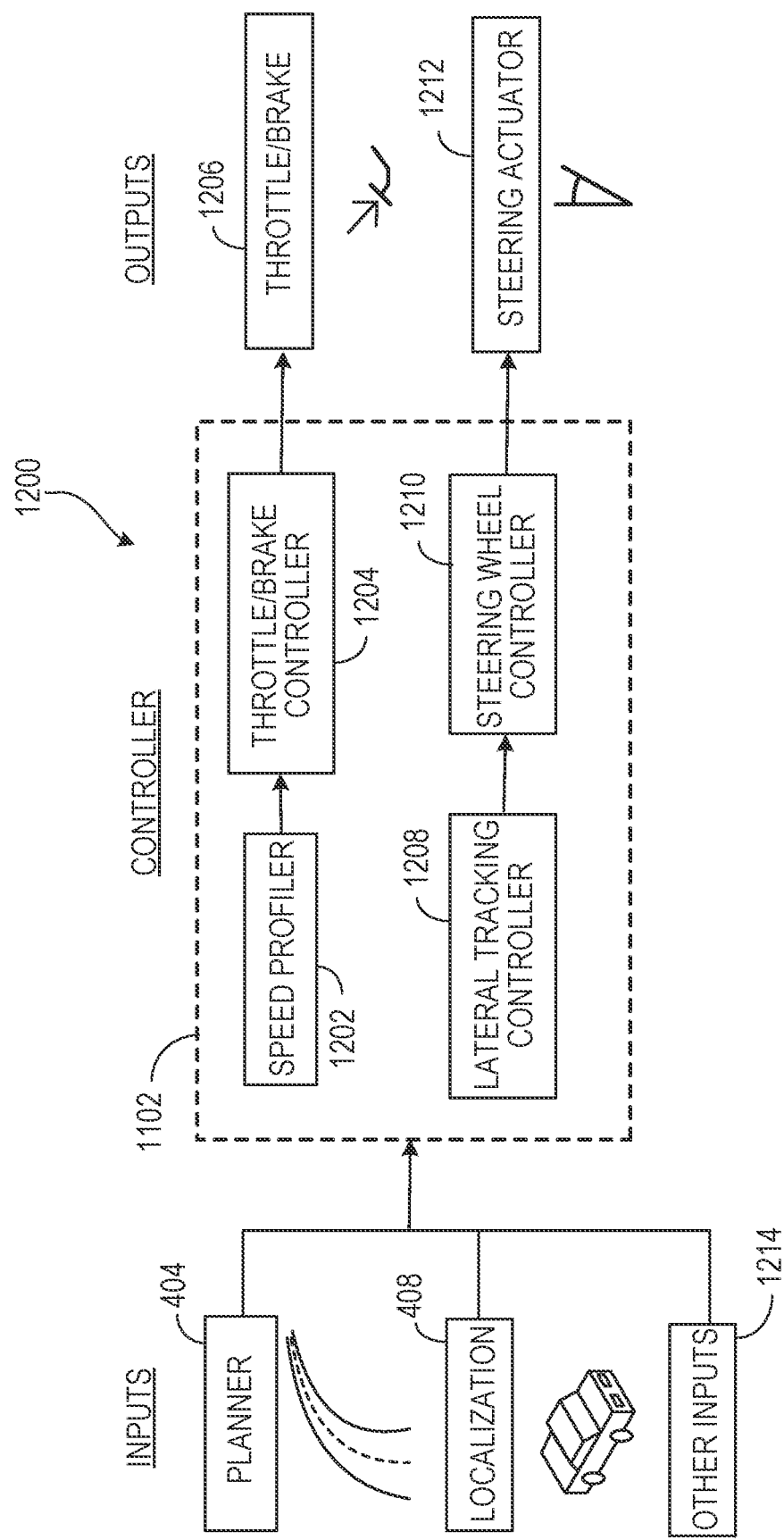
FIG. 12 shows a block diagram of the inputs, outputs, and components of a controller.

FIG. 12 shows a block diagram 1200 of the inputs, outputs, and components of the controller 1102. The controller 1102 has a speed profiler 1202 which affects the operation of a throttle/brake controller 1204. For example, the speed profiler 1202 instructs the throttle/brake controller 1204 to engage acceleration or engage deceleration using the throttle/brake 1206 depending on, e.g., feedback received by the controller 1102 and processed by the speed profiler 1202.

The controller 1102 also has a lateral tracking controller 1208 which affects the operation of a steering controller 1210. For example, the lateral tracking controller 1208 instructs the steering controller 1210 to adjust the position of the steering angle actuator 1212 depending on, e.g., feedback received by the controller 1102 and processed by the lateral tracking controller 1208.

The controller 1102 receives several inputs used to determine how to control the throttle/brake 1206 and steering angle actuator 1212. A planning system 404 provides information used by the controller 1102, for example, to choose a heading when the vehicle 100 begins operation and to determine which road segment to traverse when the vehicle 100 reaches an intersection. A localization system 408 provides information to the controller 1102 describing the current location of the vehicle 100, for example, so that the controller 1102 can determine if the vehicle 100 is at a location expected based on the manner in which the throttle/brake 1206 and steering angle actuator 1212 are being controlled. In an embodiment, the controller 1102 receives information from other inputs 1214, e.g., information received from databases, computer networks, etc.

Ground Modeling

Figure 13A:
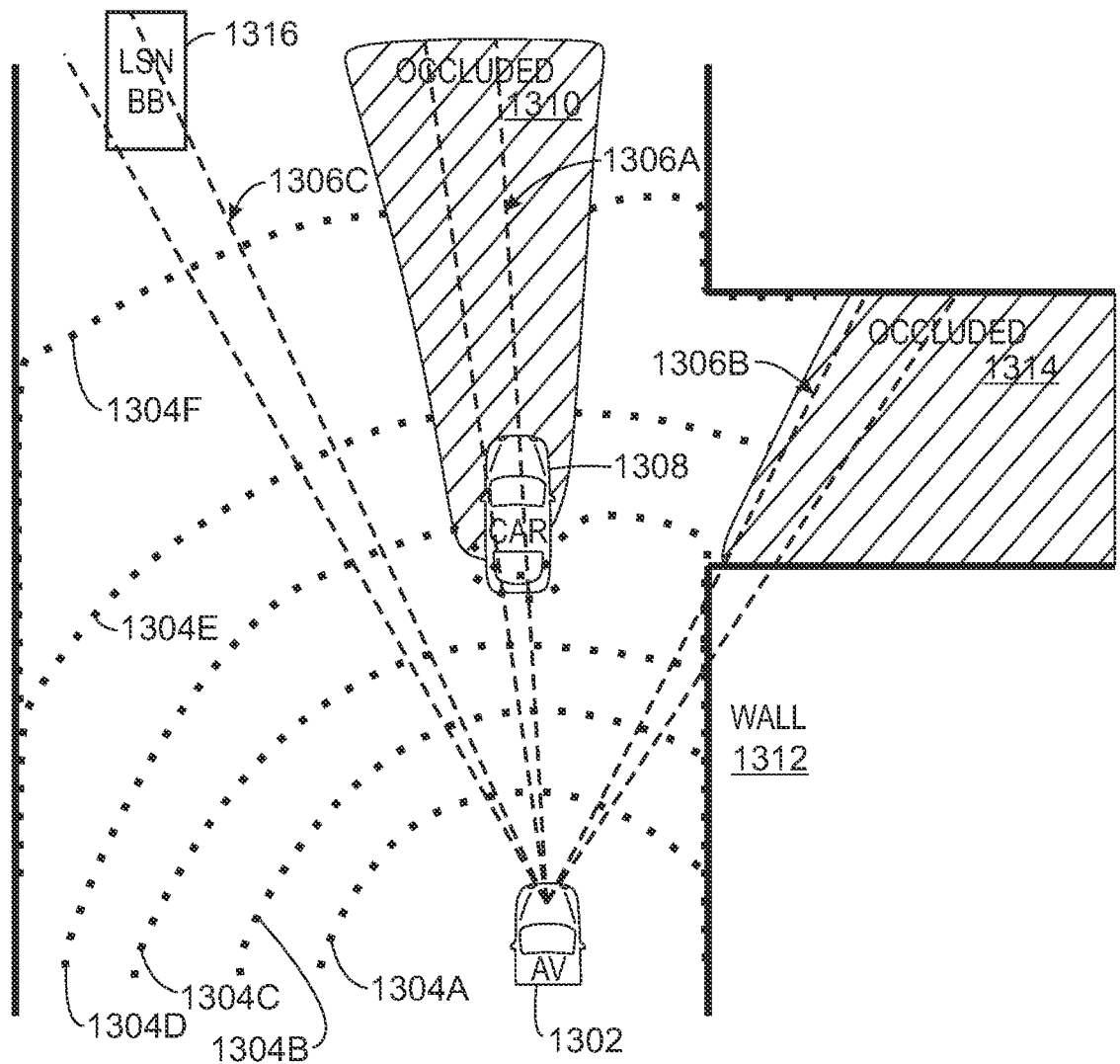
FIG. 13A is a bird's-eye view of a scene with occluded areas.

FIG. 13A is a bird's-eye view of a scene 1300A with occluded areas. In the example of FIG. 13A, the scene 1300A is a snapshot of a ground plane of an environment (e.g., environment 190 of FIG. 1) at a particular time instance. In the scene 1300A, a vehicle 1302 (e.g., vehicle 100 of FIG. 1) is illustrated with a visual representation of sensing within the scene 1300A. The sensing may be performed by one or more sensors (e.g., sensors 121 of FIG. 1). In examples, the sensor is a LIDAR (e.g., LIDAR 123 of FIG. 1). In the scene 1300, potential point cloud data points are illustrated by a plurality of range rings. The plurality of range rings includes range ring 1304A, range ring 1304B, range ring 1304C, range ring 1304D, range ring 1304E, and range ring 1304F. In examples, LIDAR based ground height detection divides a point cloud into azimuth bins. In the example of FIG. 13A, three azimuth bins 1306A, 1306B, and 1306C are illustrated using dashed lines. Each range ring represents a set of reliable data points where the ground height is directly measured within each azimuth bin.

Several techniques can be used to model the ground height surrounding the vehicle 1302. Traditionally, ground height detection is performed on a frame-by-frame basis. For example, instantaneous frame-by-frame LIDAR based ground height detection first divides a point cloud (e.g., output 504a of FIG. 5) into azimuth bins with a predefined range (e.g., 1.5 degrees each). Next, the ground height is estimated within each azimuth bin independently, based on points inside that bin up to the distance of the location in question. Traditionally, neighboring points in adjacent bins are not considered. The ground height is estimated within each azimuth bin by grouping together points within each azimuth bin to collectively determine a ground error within that bin. An instantaneous ground height measurement at an arbitrary distance contains an estimated mean (e.g., averaged, collective) of the ground height, an estimated mean of the slope, an uncertainty of the ground height, an uncertainty of the slope, or any combinations thereof. In an example, the estimated means and uncertainties are described via a Gaussian function. By dividing the sensor data into azimuth bins, the number of calculations used to calculate a ground height measurement can be reduced. Sensors often capture large amounts of data, and grouping the data into azimuth bins eliminates time consuming ground height estimations for each separate data point. Ground height is estimated within each azimuth bin independently, based on points inside bin.

The present techniques model the ground height as a height of the ground relative to the body frame of the vehicle. In an embodiment, the vehicle body frame has an origin at the center of gravity of the vehicle and can accelerate, rotate, and translate relative to an inertial reference frame, such as a global map frame. Additionally, in an embodiment the vehicle body frame has an origin at the midpoint of the rear-axle of the vehicle. In an embodiment, the global map is obtained from a localization system (e.g., localization system 408 of FIG. 4).

Instantaneous ground height detection initially calculates an estimate of ground height for those data points closest to the vehicle. In the example of scene 1300A, for the azimuth bin 1306A, ground height detection starts at range ring 1304A and detects the ground height at points corresponding to each of range ring 1304B and range ring 1304C. In an embodiment, instantaneous ground height detection begins with data points closest to the vehicle, and continues to estimate the ground height for data points farther away from the vehicle until the limit of the sensor data is met for each azimuth bin. In addition to estimating ground height, an estimation of the slope is also provided.

In the example of scene 1300A, a vehicle 1308 is located within a sensor field of view of the vehicle 1302. The azimuth bin 1306A is obstructed by the vehicle 1308. The vehicle 1308 creates an area 1310 of occlusion beyond the vehicle 1308. An occluded area is a portion of the environment for which no direct sensor data exists. Put another way, the sensors of the vehicle are unable to capture data associated with occluded areas. Generally, occlusions are the result of objects (e.g., natural obstructions 191, vehicles 193, pedestrians 192, cyclists, buildings, and other obstacles) in a scene. In the example of scene 1300A, the vehicle 1308 prevents the vehicle 1302 from obtaining sensor data from locations within the area 1310. Similarly, a wall 1312 prevents the vehicle 1302 from obtaining sensor data corresponding to the occluded area 1314. The wall 1312 obstructs the azimuth bin 1306B.

Figure 13B:
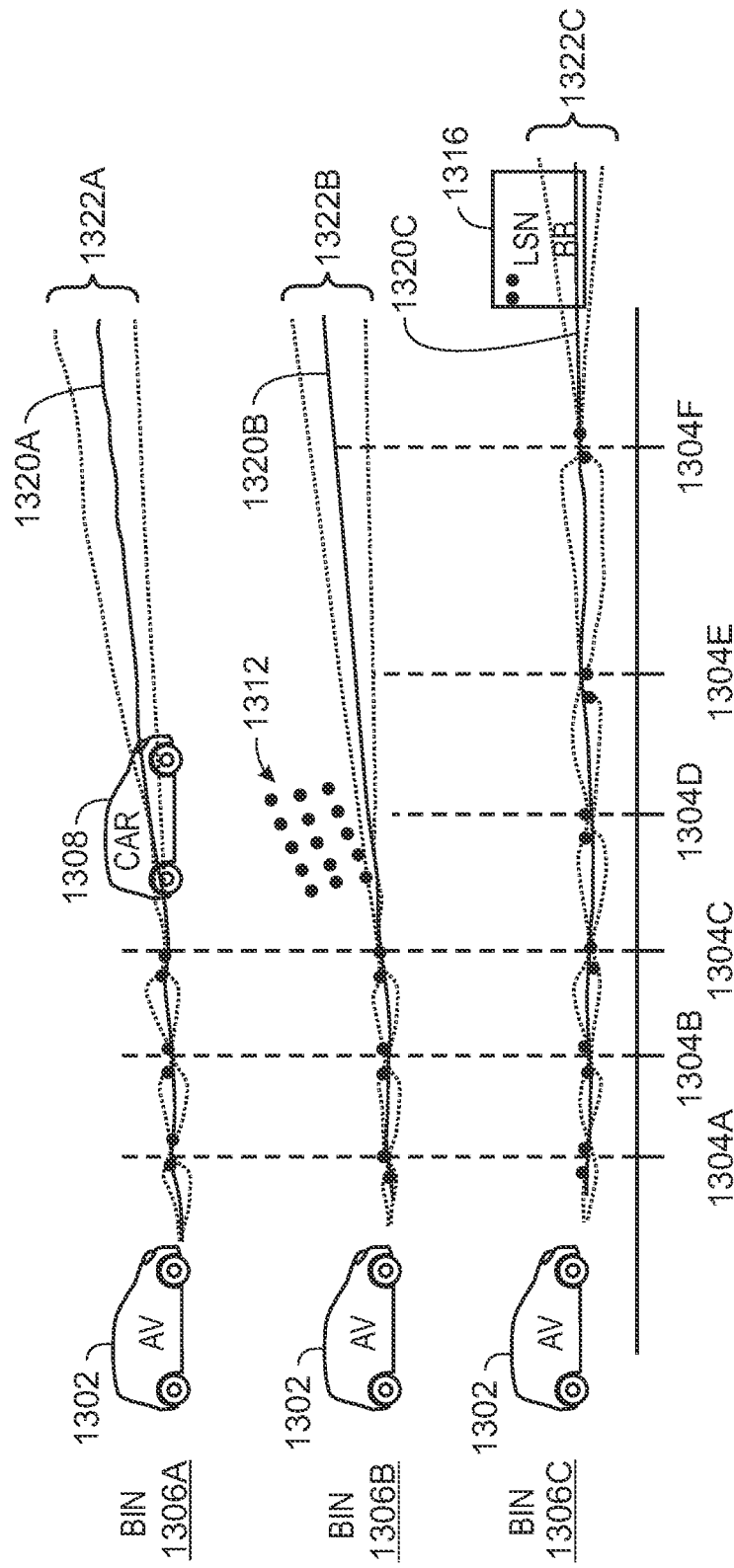
FIG. 13B is an illustration of an exemplary ground detection algorithm operating on azimuth bins.

In the presence of occlusions, an instantaneous measurement can return an estimated mean of the ground height, an estimated mean of the slope, an uncertainty of the ground height, an uncertainty of the slope, and any combinations thereof at any arbitrary distance from the vehicle. Ground height measurement in the presence of occlusions is illustrated in FIG. 13B. When an area is occluded, uncertainties associated with the ground height and slope are high. In an example, uncertainties associated with the ground height and slope in the presence of occlusions renders the ground height and slope measurements useless, as the uncertainty exceeds a reliability threshold.

The azimuth bin 1306C includes a bounding box 1316. In embodiments, the bounding box 1316 corresponds to a vehicle. The bounding box 1316 does not lead to any occlusion for the illustrated ground points since they occur before the bounding box 1316. As a result, no areas of occlusion are formed within azimuth bin 1306C. For example, consider an environment with flat, level ground along an angle of incidence that increases as the distance from the vehicle increases. Generally, a LIDAR can detect the ground height instantaneously up to a range limit of the LIDAR. For example, a LIDAR captures point cloud data up to the range limit based on, at least in part, the LIDAR hardware. The range limit associated with the LIDAR hardware can further vary according to the LIDAR model, LIDAR type, and LIDAR brand. In an example, when point cloud data is available, the instantaneous ground height measurement is an instantaneous ground height detection. Instantaneous ground height detection can occur with azimuth bin 1306C to the full range of the sensor hardware. In an example, a ground height is predicted for points beyond a range of the sensor by continuing propagating the available ground height measurement along the azimuth bin. In an example, the ground height beyond the range limit is based on a bounding box 1316 predicted by a LiDAR semantic network (LSN). In embodiments, the bounding box 1316 output by the LSN prediction is another form of ground height measurement that is fused by the Bayesian filtering.

The scene 1300A of FIG. 13A is not intended to indicate that the scene 1300A is to include all of the components shown in FIG. 13A. Rather, the scene 1300A can include fewer or additional components not illustrated in FIG. 13A (e.g., additional objects, areas of occlusion, etc.). The scene 1300A may include any number of additional components not shown, depending on the details of the specific implementation. Furthermore, instantaneous ground height detection, pseudo ground height generation and other described functionalities may be partially, or entirely, implemented in hardware and/or in a processor. For example, the functionality may be implemented with an application specific integrated circuit, in logic implemented in a processor, in logic implemented in a specialized graphics processing unit, or in any other device.

FIG. 13B is an illustration of an exemplary ground detection algorithm operating on azimuth bins 1300B. The azimuth bins include bin 1306A, 1306B, and 1306C that originate at the vehicle 1302 as illustrated in FIG. 13A. Generally, azimuth bins 1300B are illustrated along a hypothetical path of increasing distance from the vehicle through the azimuth bin, where occlusions (e.g., car 1308, wall 1312 of FIG. 13A) and range rings 1304A, 1304B, 1304C, 1304D, 1304E or 1304F occur. Additionally, as described with respect to FIG. 13A, instantaneous ground height detection starts with data points closest to the vehicle 1302 and is available until an occlusion occurs or the limits of the sensor hardware are reached. For example, in the azimuth bin 1306A, the car 1308 causes an occlusion near range ring 1304D. In an embodiment, an assumption is made that the area immediately beneath the vehicle 1308 is an accurate ground height detection.

Line 1320A represents a ground height measurement. In an example, the ground height is an instantaneous ground height measurement as described above. Dashed lines 1322A represent a measurement uncertainty associated with the instantaneous ground height measurement. In an example, the measurement uncertainty is based on a reliability or accuracy of the instantaneous ground height measurement. Accordingly, for azimuth bin 1306A, as the distance from the vehicle 1302 increases (given that it is after the occlusion), the measurement uncertainty 1322A associated with the ground height measurement 1320A increases. The measurement uncertainty decreases at each observed range ring 1304A, 1304B, and 1304C. The measurement uncertainty decreases at each observed range ring as instantaneous ground height detection typically estimates a ground height using captured sensor data at each range ring, where each range ring represents a set of reliable data points for which the ground height is directly measured. Thus, the ground height measurements at each range ring are more reliable and certain than the estimates that occur at points other than the range ring. In an embodiment, for locations other than those on the range ring, the ground height is estimated from the ground height measured at neighboring range rings. The car 1308 represents an occlusion within the azimuth bin 1306A. Beyond the car 1308, the measurement uncertainty 1322A associated with the ground height measurement 1320A increases with the distance and does not decrease. In an embodiment, the measurement uncertainty associated with the ground height measurement increases with the distance and does not decrease due to a lack of available sensor data for ground height estimation.

Similarly, for azimuth bin 1306B the measurement uncertainty increases with an increasing distance from the vehicle 1302 and decreases at each observed range ring 1304A, 1304B, and 1304C until the wall 1312 occludes the field of view. Beyond the wall 1312, the measurement uncertainty 1322B associated with the ground height measurement 1320B increases as the distance from the vehicle 1302 increases. For azimuth bin 1306C, the measurement uncertainty increases with an increasing distance from the vehicle 1302 and decreases at each observed range ring 1304A, 1304B, 1304C, 1304D, 1304E, 1304F until the a range limit of the sensor hardware is met. Beyond the range limit, LSN prediction of the ground height 1320C based on the bounding box 1316 occurs.

The azimuth bins 1300B of FIG. 13B are not intended to indicate that the azimuth bins 1300B are to be configured as shown in FIG. 13B. Rather, the azimuth bins 1300B can include fewer or additional components not illustrated in FIG. 13B (e.g., additional objects, areas of occlusion, etc.). The azimuth bins 1300B may include any number of additional components not shown, depending on the details of the specific implementation. Furthermore, instantaneous ground height detection, pseudo ground height generation and other described functionalities may be partially, or entirely, implemented in hardware and/or in a processor. For example, the functionality may be implemented with an application specific integrated circuit, in logic implemented in a processor, in logic implemented in a specialized graphics processing unit, or in any other device.

In the example of FIGS. 13A and 13B, the ground height measurement is determined for each azimuth bin independently of other azimuth bins. For example, in determining an instantaneous ground height, the azimuth bin 1306C is not used to determine an estimate of ground height for azimuth bin 1306A or azimuth bin 1306B. As a result, the ground height measurement determined using azimuth bins may not incorporate neighboring ground heights and is spatially inconsistent. Put another way, the use of azimuth bins to determine a ground height measurement does not consider lateral ground detection information. Additionally, an instantaneous ground height measurement using azimuth bins occurs at a single time stamp. In an embodiment, the instantaneous ground height measurement lacks historical information carried over from previous time stamps. Accordingly, the instantaneous ground height measurement using azimuth bins is a frame by frame measurement and is temporally inconsistent.

The present techniques enable a ground height measurement that includes context such as lateral neighboring information, lane information, and LSN bounding boxes (e.g., LSN bounding box 1316). Lateral neighboring information includes, for example, information from adjacent azimuth bins. Lane information includes lane smoothness and slope. For example, the ground height on the same lane will usually be smoother, the estimated or prior lane slope can help to better propagate the ground depth estimation. In embodiments, lane information can be used to group LIDAR points together under the assumption that points falling on to a single lane segment will all share a similar height and have a relatively smooth and constant slope (for local segments in a local neighborhood). By incorporating context information, the ground height measurement according to the present techniques is spatially and temporally consistent. In some embodiments, the present techniques fuse ground height measurements with other ground detection techniques. In an embodiment, the present techniques create a framework for spatially and temporally consistent ground height estimation through fusion with other ground detection techniques and yields reliable ground height estimates beyond occlusions and beyond a ground range of a sensor.

Figure 14:
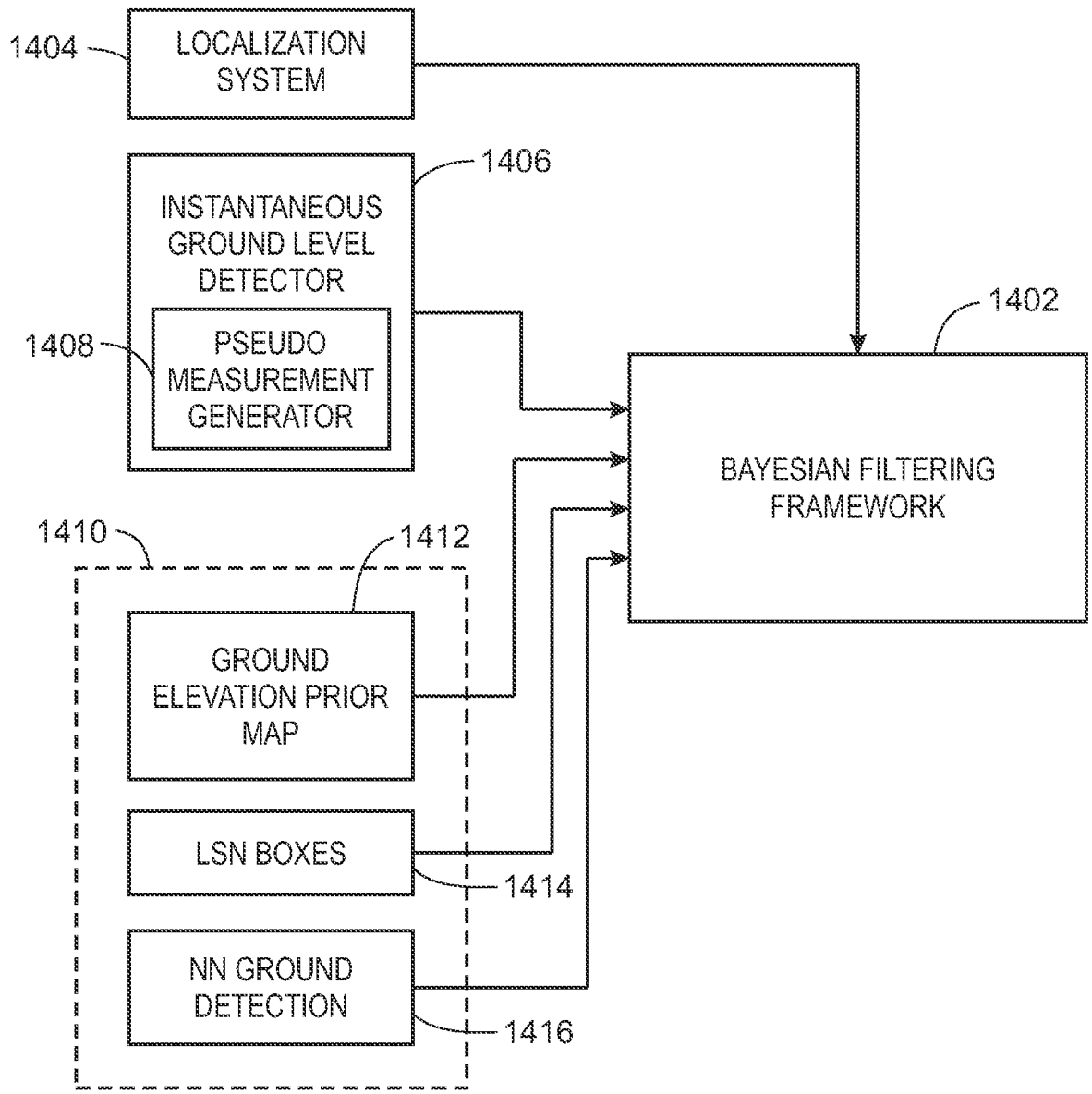
FIG. 14 is a block diagram of a system for spatially and temporally consistent ground modeling with information fusion.

System for Spatially and Temporally Consistent Ground Modelling with Information Fusion FIG. 14 is a block diagram of a system 1400 for spatially and temporally consistent ground modeling with information fusion. The system 1400 includes a number of ground height representations, including but not limited to detectors, estimators, and measurements. A Bayesian filtering framework 1402 fuses the varying ground height representations and outputs a spatially and temporally consistent ground height measurement.

The Bayesian filtering framework 1402 uses one or more Bayesian techniques, such as parameter estimation (e.g., approximate the posterior state distribution over a plurality of parameters given some observed data) and/or model comparison (e.g., comparing output of a set of approximation algorithms), to make inferences according to observed data. In an embodiment, the Bayesian filtering framework outputs a final value based on one or more inputs. In embodiments, the final ground height estimates output by the Bayesian filtering framework are propagated from the posterior state distribution at timestamp T to the prior state distribution at timestamp T+1. The Bayesian filtering framework can assign at least one weight to one or more ground height representations according to a context or uncertainty associated with the ground height representation (e.g., other measurement input uncertainty). In an example, the weights assigned by the Bayesian filtering framework are based on a measurement uncertainty associated with the ground height representation. For example, an instantaneous ground height detection at a range ring as described with respect to FIGS. 13A and 13B is assigned a higher weight due to the low measurement uncertainty associated with the instantaneous ground height detection at a range ring. By contrast, an instantaneous ground height prediction in an occluded area or beyond a range limit of a sensor as described with respect to FIGS. 13A and 13B is assigned a lower weight due to a high measurement uncertainty associated with the instantaneous ground height prediction.

FIG. 14 includes multiple sources of ground height representations, such as an instantaneous ground height detector 1406, pseudo ground height generator 1408, and other ground height measurements 1410 including a ground elevation prior map 1412, LSN bounding boxes 1412, and neural network ground detection 1416. At least one ground height representation is input to the Bayesian filtering framework, weighted, and fused with other ground height representations to generate a final ground height estimate. For ease of description, the output of the Bayesian filtering framework is described as a ground height representation. However, the present techniques are applicable to any ground measurement, including the slope of the ground.

The localization system 1404 (e.g., localization system 408 of FIG. 4) provides input to the Bayesian filtering framework 1402. The localization system 1404 provides vehicle pose information, including the orientation and a location of the vehicle by using data from at least one sensor and data from a database system. In an example, the localization system 1404 uses data from a GNSS sensor and geographic data to calculate a longitude and latitude of the vehicle. In an example, data output by the localization system 1404 besides the above mentioned vehicle poise includes high-precision maps of the roadway geometric properties, maps describing road network connectivity properties, maps describing roadway physical properties, and the like. Accordingly, in an embodiment the localization system 1404 provides ego vehicle movement (i.e. localization information) to be used for ground height propagation in the Bayesian Filtering framework 1402.

An instantaneous ground height detector 1406 determines a ground height measurement. For example, the instantaneous ground height detector 1406 determines a ground height measurement as described with respect to FIGS. 13A and 13B. Accordingly, ground height measurement by the instantaneous ground height detector 1406 estimates the ground height for data points based on a respective azimuth bin. In addition to the use of azimuth bins to determine a ground height measurement, the instantaneous ground height detector 1406 includes a pseudo ground height generator 1408. The pseudo ground height generator 1408 calculates a pseudo ground height measurement based on, at least in part, the instantaneous ground height detection or prediction from the instantaneous ground height detector. Generally, the pseudo ground height measurement is calculated by propagating an instantaneous ground height measurement from one or more nearest neighbors. In an embodiment, pseudo ground height measurements are generated for locations beyond a range using instantaneous ground heights from closer range (i.e. anchor cells). The generation of pseudo ground height is further described with respect to FIG. 15A below.

Other ground height representations 1410 are provided as input to the Bayesian filtering framework 1402. In some embodiments, an other ground height representation is not available or not provided as input to the Bayesian filtering framework 1402. For exemplary purposes, specific other ground height representations are described. However, the present techniques are not limited to the particular other ground height representations described herein and can include any ground height representation from any source. The other potential measurements include a ground elevation prior map 1412, LSN bounding boxes 1414, and neural network ground detection 1416.

The ground elevation prior map 1412 characterizes the ground surface according to its height and slope. In an example, the ground elevation prior map provides a ground height for each location on a global map, where the global map is a high-definition map. The present techniques translate a prior map location and an orientation to the body frame coordinate system to extract an estimate of ground height using the ground elevation prior map 1412. In embodiments, the Bayesian filtering framework assigns a higher weight to ground height measurements from the elevation map 1412. The neural network ground detection 1416 uses a neural network to detect a ground height. In an example, the neural network takes as input a three-dimensional (3D) point cloud and outputs an estimate of ground height. The neural network is trainable using one or more inputs. Generally, an LSN receives as input LIDAR sensor data and processes the sensor data to detect an object (e.g., natural obstructions 191, vehicles 193, pedestrians 192, of FIG. 1; cyclists, and other obstacles) or the lack of an object in the environment. The LSN generates a set of bounding boxes for potential objects in the 3D space and confidence scores for the presence of object class instances (e.g., cars, pedestrians, or bikes) within the bounding boxes. The higher the classification score, the more likely the corresponding object class instance is present in a box. In an embodiment, the bounding boxes (e.g., LSN boxes 1414) include an estimate of the ground height. In an embodiment, an estimate of ground height is extracted using one or more bounding boxes.

Referring again to the Bayesian filtering framework 1402, the ground height for a number of data points is determined. For example, a scene is divided into one or more cells using a ground height grid map (e.g., grid map 1500A of FIG. 15). The Bayesian filtering framework 1402 outputs a ground height estimate for each cell of the ground height grid map. Generally, the height estimate for each cell location is modeled (e.g., described, characterized) as the heights at the center location of each cell.

In an example, input to the Bayesian filtering framework 1402 is a grid map with an instantaneous ground height and instantaneous measurement uncertainty for each cell location determined by azimuth binning. Cells with actual detected ground data (e.g., outputs 504a-d of FIG. 5; FIGS. 13A and 13B) are distinguished from other cells and marked as anchor cells. In embodiments, the estimated ground height and instantaneous measurement uncertainty from azimuth binning used as detected ground height. In an example, an assumption is made for an anchor cell that the detected ground height is accurate. For a cell without detected ground data, such as cells between LiDAR layers, behind occlusions, or beyond a range limit of the sensor, additional pseudo measurements are generated. These cells are marked as non-anchor cells. In an embodiment, the additional measurements include a pseudo ground height, ground elevation prior map, LSN boxes, and neural network ground estimate. For non-anchor cells, the ground height measurement is a fusion of the additional measurements. The Bayesian filtering framework 1402 iteratively propagates the ground height measurement and updates the ground height for a series of timestamps.

In an example, a posterior state distribution (e.g., ground height measurement, slope) is given a time stamp T at the Bayesian filtering framework. The posterior state distribution at time T−1 is propagated to the prior state distribution of the current timestamp, time T. This propagation transforms the posterior state distribution into the prior state distribution of the current timestamp. In embodiments, localization is used to propagate the ground height estimates from the posterior state distribution at timestamp T−1 to the prior state distribution at timestamp at T. Localization is used for propagation since the grid map of ground height estimates has an origin in the vehicle frame (local frame). When the vehicle moves, the previous estimates are moved correspondingly in the grid map. When a new ground height representation is received at time T, the new measurement is integrated using Bayesian filtering techniques and the posterior state distribution for time T is produced. In an embodiment, the Bayesian filtering framework iteratively updates the ground height measurement for each grid cell. In an embodiment, the Bayesian filtering framework 1402 uses a Kalman filter to iteratively propagate the ground height and slope (e.g., state) over time in the presence of noise, such as uncertainties.

The propagation from time T−1 to time T introduces process noise associated with a propagation uncertainty. The ground height is propagated along with the propagation uncertainty. The propagation uncertainty between timestamps is used to calculate the uncertainty of the prior state distribution. In an embodiment, the propagation uncertainty is different from the measurement uncertainty (the measurement uncertainty indicates the reliability of confidence associated with the ground height measurement itself.) Additionally, in an embodiment the propagation uncertainty jointly works with all other uncertainties within the Bayesian filtering framework to yield the best (most optimal) estimate. Uncertainties include, for example, instantaneous measurement uncertainty, other measurement input uncertainty, pseudo propagation uncertainty, pseudo measurement uncertainty, Bayesian propagation uncertainty, and Bayesian final output uncertainty.

In an embodiment, the propagation uncertainty represents a variance between the posterior ground height estimate (e.g., "should be" location) at timestamp T−1 and the prior ground height estimate (e.g., predicted location) at timestamp T. The propagation uncertainty directly affects the ground height estimate of all locations. In an embodiment, the measurement uncertainty and propagation uncertainty associated with a ground height estimate at a timestamp are used to calculate at least one weight. For example, the smaller the propagation uncertainty (noise that is introduced due to the state propagation process), the higher the weight applied to the posterior ground height from the previous timestamp. In this manner, the Bayesian filtering framework will favor the posterior ground height from the previous timestamp. The higher the propagation uncertainty, the lower the weight applied to the posterior ground height from the previous timestamp. This results in the Bayesian filtering framework favoring the current ground height measurement at time T for the cell. In an embodiment, the Bayesian filtering framework outputs a ground height estimate for each cell and a plurality of uncertainties.

The propagation according to the present techniques carries over information from one timestamp to another timestamp to enable temporal consistency. The propagation uncertainty may grow based on localization errors. Even though a ground height is accurately determined, the propagation uncertainty grows in the presence of localization errors. For example, when localization is not precise the vehicle could be assumed to have a certain degree of pitch based on the received localization data, while the actual degree of pitch is slightly different. This could occur when the vehicle rolls over a speed bump. The present techniques propagate multiple forms of uncertainty with the associated ground height across time, enabling accurate ground height estimation that ignores ground height estimates associated with large localization errors. With improved localization, propagation noise is reduced. Accordingly, the present techniques adaptively rely on localization data as the localization data is more reliable.

The system 1400 of FIG. 14 is not intended to indicate that the system 1400 is to include all of the components shown in FIG. 14. Rather, the system 1400A can include fewer or additional components not illustrated in FIG. 14 (e.g., additional ground height detectors, additional other ground height measurements, no other ground height measurements, etc.). The system 1400 may include any number of additional components not shown, depending on the details of the specific implementation. Furthermore, instantaneous ground height detection, pseudo measurement generation and other described functionalities may be partially, or entirely, implemented in hardware and/or in a processor. For example, the functionality may be implemented with an application specific integrated circuit, in logic implemented in a processor, in logic implemented in a specialized graphics processing unit, or in any other device.

Figure 15A:
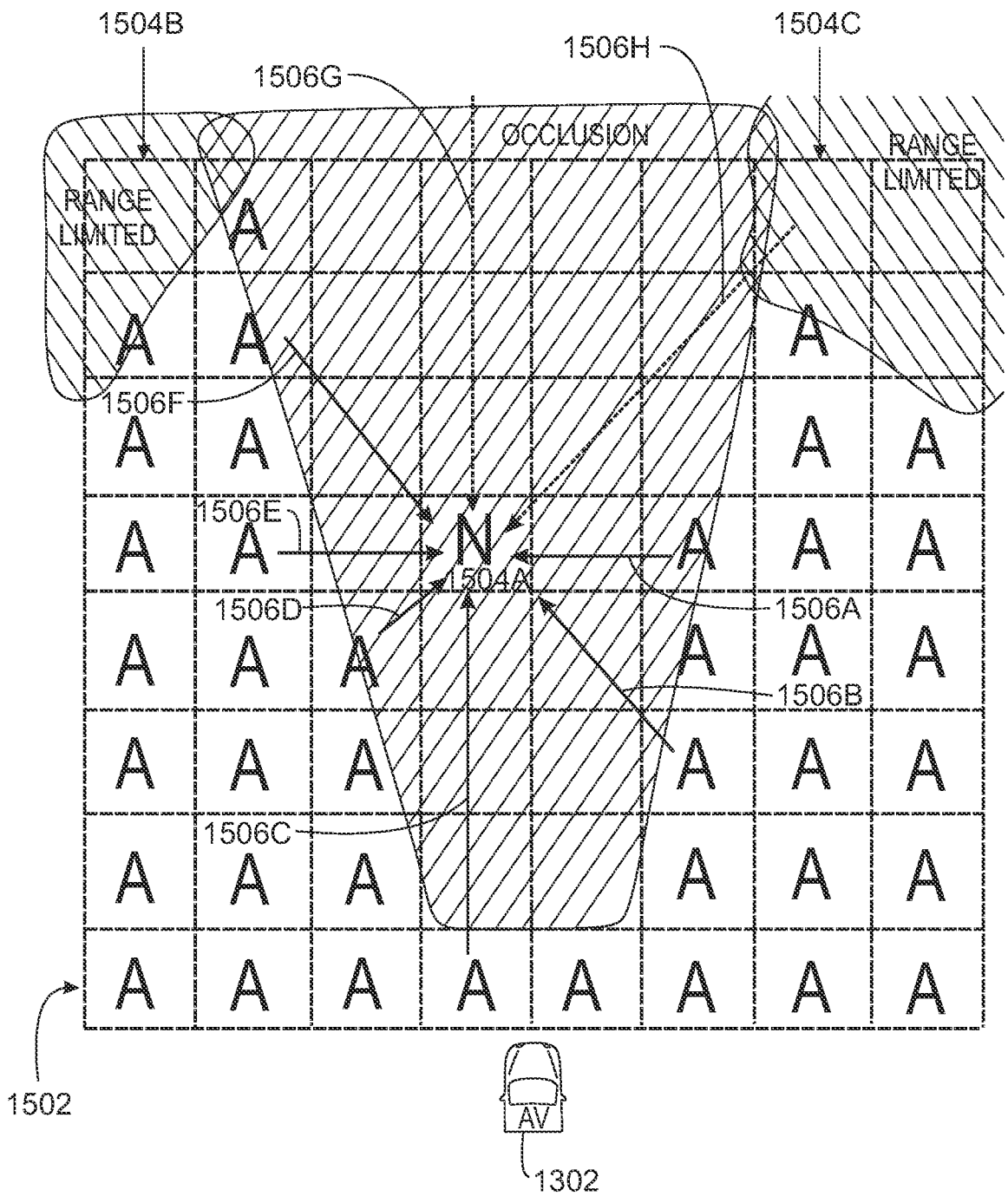
FIG. 15A is an illustration of a two dimensional ground height grid map.

FIG. 15A is an illustration of a two dimensional (2D) ground height grid map 1500A. In an embodiment, the Bayesian filtering framework 1402 of FIG. 14 outputs a final ground height measurement for each cell of a ground height grid map. In an embodiment, a grid map 1500A enables pseudo ground height generation (e.g., pseudo ground height generator 1408 of FIG. 14) as described above. Accordingly, although a single ground height grid map is illustrated the present techniques can incorporate one or more grid maps at one or more resolutions.

In an example, the 2D ground height grid map 1500A contains estimations of the ground height of the vehicle (e.g., vehicle 100 of FIG. 1). The resolution of the grid map 1500A is predetermined. For example, the grid map captures a 200 meter (m)×200 m local region with 0.2 m×0.2 m resolution cells. Each cell represents a small area with a fixed location in the local map, with the origin of this map being the vehicle frame. In an embodiment, the grid map is a sub-region from the global map. The ground height is estimated for each individual cell. The use of the grid map enables a location-consistent canvas, such that a cell's location does not change.

The grid map 1500A includes anchor cells 1502 and non-anchor cells 1504. In an embodiment, an anchor cell is a cell with either direct ground points inside it, or at least one cell with direct ground points longitudinally after it within the same azimuth bin. A cell with direct ground points longitudinally after it is typically between the ground range rings and is less likely to be occluded. In an embodiment, ground detection is good for an anchor cell, and is used as the ground height for the cell. In an embodiment, a non-anchor cell is the opposite of an anchor cell, representing the cells likely to be behind an occlusion or beyond a LIDAR ground detection range, and their ground detection is not as reliable. A pseudo ground height is calculated for each non-anchor cell.

For example, an anchor cell 1502 is an area of the grid map for which reliable ground height data exists. In the example of FIG. 15, the anchor cells are illustrated with an "A" in the cell. In an embodiment, reliable ground height data is a direct measurement of the ground height at a point within the cell. In an embodiment, reliable ground height data is instantaneous ground height detections with low uncertainties derived from azimuth binning. In an example, an anchor cell is a cell for which ground LIDAR points exist. In an example, an anchor cell is a cell which overlaps with an azimuth bin containing ground LIDAR points. In an example, an anchor cell is a cell that is not likely to be occluded by tall objects. The final ground height measurement output by the Bayesian filtering framework 1402 is based on the detected ground LIDAR points or the existing azimuth bin information associated with that cell.

In another example, non-anchor cells 1504 are cells with no ground LIDAR points, or a cell in an azimuth bin with no existing ground LIDAR points. Generally, a non-anchor cell is a cell of the grid map where no reliable ground height data exists. In an embodiment, a non-anchor cell is not observable through direct sensor measurement, and is more likely to be occluded. In the example of FIG. 15A, the non-anchor cell 1504A may be due to an occlusion. The occlusion may be, for example the occluded area 1310 of FIG. 13A. In another example, a non-anchor cell is beyond the range of the sensor hardware, such as a LIDAR. The non-anchor cells 1504B and 1504C are due to range limitations of sensor hardware. The present techniques determine a ground height estimate for non-anchor cells that is based on, at least in part, contextual data.

In pseudo ground height measurement generation, a ground height estimate and a corresponding pseudo measurement uncertainty and pseudo propagation uncertainty is derived from contextual data extracted from the grid map. In particular, for a current non-anchor cell N, the nearest neighbor anchor cells $A_j$ of the current non-anchor cell are found. In the example of FIG. 15, the nearest neighbors are the eight nearest anchor cells along the 45° directions on the grid map 1500. In an embodiment, the nearest neighbors are the sixteen nearest anchor cells every 22.5° along the grid map.

For the non-anchor cell N of FIG. 15, a total of eight arrows are drawn to illustrate the source of contextual data used to generate a pseudo ground height for non-anchor cell N. As illustrated, arrow 1506A, arrow 1506B, arrow 1506C, arrow 1506D, arrow 1506E, and arrow 1506F each originate from anchor cell for which a ground height estimate is available. In an embodiment, the ground height estimation from each respective anchor cell is propagated and a weight factor based on distance is applied to calculate a pseudo measurement for non-anchor cell N.

In the example of FIG. 15A, the arrow 1506G and the arrow 1506H are illustrated using a dashed line. For each of the arrow 1506G and 1506H, reliable anchor cell data does not exist. Put another way, the sensor hardware of the vehicle is unable to observe or obtain ground height estimations for these areas. In an embodiment, no nearest neighbor data is contributed from directions associated with arrows 1506G and 1506H. In an embodiment, predictive data is available from the directions associated with arrows 1506G and 1506H. For example, when object prediction network data is available, portions of the predictive data may be used to generate a pseudo ground height for the non-anchor cell N.

The grid map 1500A of FIG. 15A is not intended to indicate that the grid map 1500A is to include all of the components shown in FIG. 15A. Rather, the grid map 1500A can include fewer or additional components not illustrated in FIG. 15A (e.g., additional anchor cells, additional non-anchor cells, additional areas of occlusions, additional range limited areas, etc.). The grid map 1500A may include any number of additional components not shown, depending on the details of the specific implementation. Furthermore, instantaneous ground height detection, pseudo measurement generation and other described functionalities may be partially, or entirely, implemented in hardware and/or in a processor. For example, the functionality may be implemented with an application specific integrated circuit, in logic implemented in a processor, in logic implemented in a specialized graphics processing unit, or in any other device.

Figure 15B:
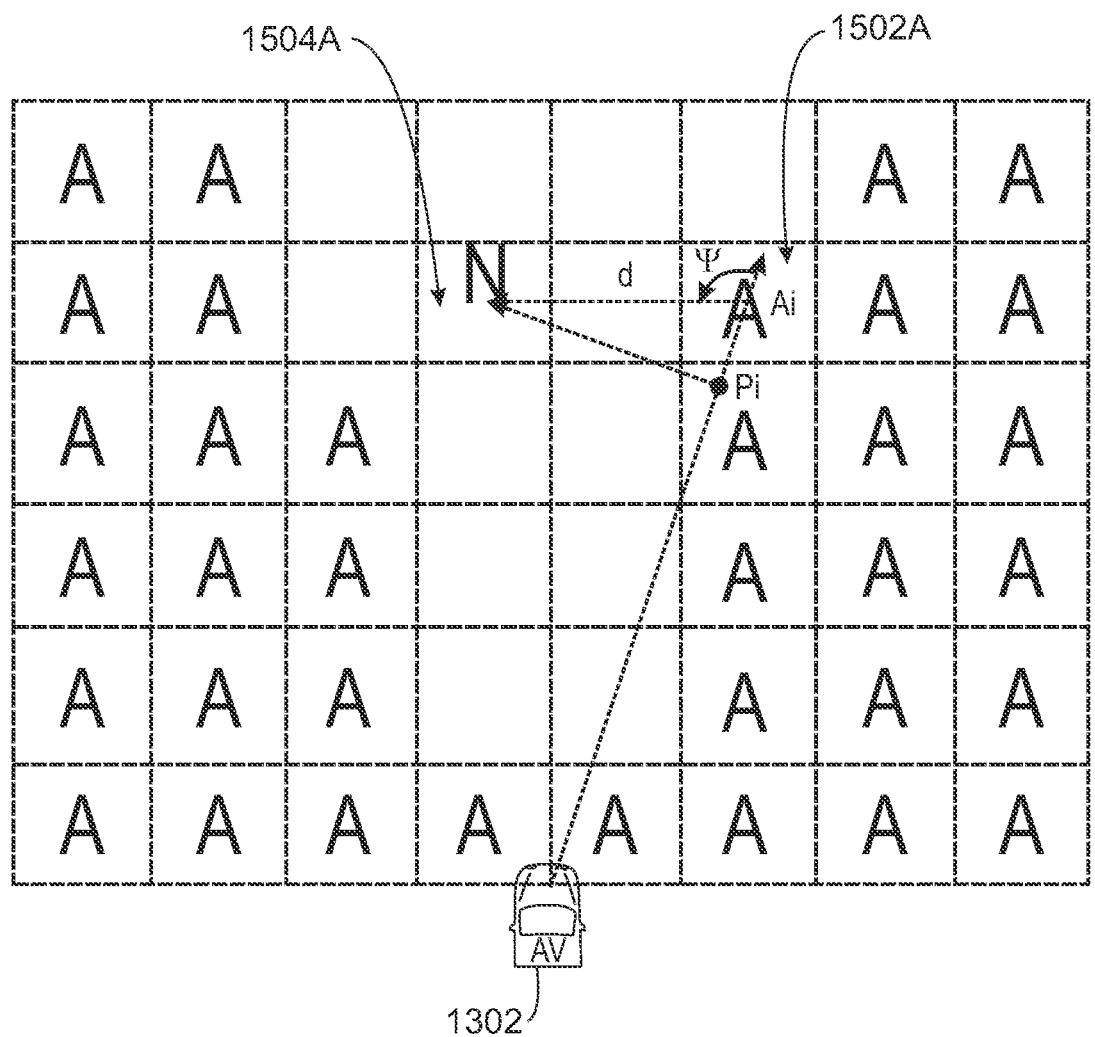
FIG. 15B is an illustration of pseudo ground height measurement generation via a grid map.

FIG. 15B is an illustration of pseudo ground height measurement generation via a grid map 1500B. In the example of FIG. 15B, each nearest neighbor anchor cell provides context to contribute to the prediction of the ground height for a corresponding non-anchor cell. The predictions are combined to form a single pseudo ground height measurement for a non-anchor cell N 1504A. For a non-anchor cell N 1504A, a pseudo ground height measurement is generated from one or more nearest neighbor anchor cells $A_i$. Anchor cell $A_i$ 1502A has a detected, reliable predicted ground height $h_i$ and a slope $h_i'$ at its centroid location ($X_{bt}$, $Y_{bt}$). The distance between non-anchor cell N and anchor cell $A_i$ is d=dist(N, $A_i$) and the yaw angle between anchor cell $A_i$'s nominal diagonal direction to non-anchor cell N is $\Psi$. The pseudo ground height prediction of the non-anchor cell N based on anchor cell $A_i$ is:

$z_i = dh_i' \cos \Psi + h_i$

This assumes N follows the same slope as anchor cell $A_i$ and has the same height at a closest point $P_i$ on the slope. The uncertainty for the pseudo ground height measurement $z_i$ includes two parts. The first part is a pseudo measurement uncertainty of $P_i$, and the second part is the pseudo propagation uncertainty from $P_i$ to N due to d. Suppose that the pseudo propagation uncertainty is $\sigma_{ud}^2$ at unit distance, which can be learned statistically from data, and the measurement uncertainty associated with the ground height $h_i$ and a slope $h_i'$ of the anchor cell $A_i$ are known as the variance $\sigma_{h_i}^2$ and $\sigma_{h_i'}^2$, the covariance COV ($h_i$, $h_i'$), then a pseudo measurement uncertainty is calculated as:

$\sigma_{z_i}^2 = \sigma_{h_i}^2 + (d \cos \Psi)^2 \sigma_{h_i'}^2 + 2d \cos \Psi \, COV(h_i, h_i') + 2d \sin \Psi \sigma_{ud}^2$ where the COV($h_i$, $h_i'$) is an instantaneous measurement uncertainty. For ease of illustration, a pseudo ground height prediction based on a single nearest neighbor anchor cell is illustrated in FIG. 15B. However, the present techniques incorporate pseudo ground height prediction from a plurality of anchor cells. The pseudo ground heights from the nearest neighbors are combined to generate a single pseudo measurement for the non-anchor cell. A weight factor for each nearest neighbor pseudo measurement is:

$$w_i = \frac{\frac{1}{\sigma_{z_i}^2}}{\sum_{i=0}^{n-1} \frac{1}{\sigma_{z_i}^2}}$$

where n is the number of neighboring anchor cells. The pseudo ground height (e.g., mean) is calculated as the weighted arithmetic mean:

$$z = \sum_{i=0}^{n-1} w_i z_i$$

With the pseudo measurement uncertainty (e.g., variance) of the combined pseudo measurements being:

$$\sigma_z^2 = \sum_{i=0}^{n-1} \left( w_i^2 \sigma_{z_i}^2 \right)$$

Accordingly, assuming the i-th nearest neighbor cell is $A_i$, and $A_i$'s ground height estimation is available, and the present techniques predict/propagate a ground height from $A_i$ to N a pseudo ground height. The larger the distance between $A_i$ and N, the more uncertain this prediction of N's height would be, and thus contribute less to N's combined pseudo measurement. In sum, as described by the above equations, a mean (e.g., ground height) and variance (e.g., uncertainty) are propagated from anchor cells to non-anchor cells. A single pseudo measurement is formed for the non-anchor cell. There is an uncertainty for each anchor cell and there is a distance between each anchor cell and the non-anchor cell. In an embodiment, the uncertainty is propagated based on distance. A weighted average of all means (e.g., ground heights) and variances (e.g., uncertainties) is calculated. In an embodiment, the weight factor includes an inverse of the uncertainty from anchor cell $A_i$ corresponding to a weighted arithmetic mean. Accordingly, the larger the distance between the anchor cell and the non-anchor cell, the smaller the contribution of the anchor cell to the pseudo ground height measurement for the non-anchor cell.

The grid map 1500B of FIG. 15B is not intended to indicate that the grid map 1500B is to include all of the components shown in FIG. 15B. Rather, the grid map 1500B can include fewer or additional components not illustrated in FIG. 15B (e.g., additional anchor cells, additional non-anchor cells, additional areas of occlusions, additional range limited areas, etc.). The grid map 1500B may include any number of additional components not shown, depending on the details of the specific implementation. Furthermore, pseudo measurement generation and other described functionalities may be partially, or entirely, implemented in hardware and/or in a processor. For example, the functionality may be implemented with an application specific integrated circuit, in logic implemented in a processor, in logic implemented in a specialized graphics processing unit, or in any other device.

Figure 16A:
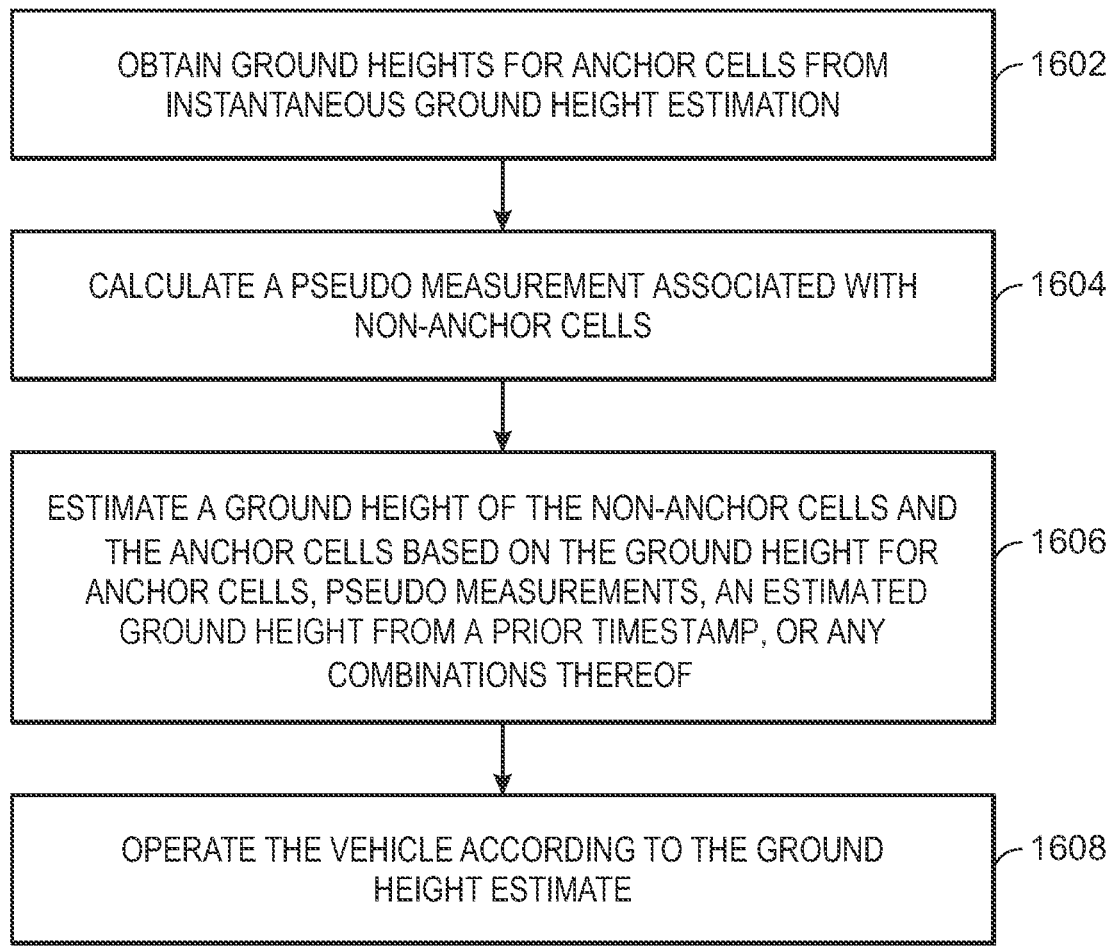
FIG. 16A is a process flow diagram of a process for spatially and temporally consistent ground modelling with information fusion.

Process for Spatially and Temporally Consistent Ground Modelling with Information Fusion FIG. 16A is a process flow diagram of a process 1600A for spatially and temporally consistent ground modelling with information fusion. At block 1602, a ground height for at least one anchor cell is obtained from instantaneous ground height estimation. Instantaneous ground height estimation includes, for example, instantaneous frame-by-frame LIDAR based ground height detection. A vehicle location and orientation is obtained from a localization network (e.g., localization system 1404 of FIG. 14). At block 1604, a pseudo ground height measurement associated with non-anchor cells of a grid map of the vehicle is calculated. In an example, the pseudo ground height measurement is determined as described with respect to FIGS. 15A and 15B as described above. In some embodiments, at least one other ground height measurement is obtained. In an example, the at least one other ground height measurement is a ground elevation prior map, LSN boxes, and neural network ground detection, or any combination thereof. At block 1606, a ground height of the anchor cells and the non-anchor cells is estimated based on the ground heights for anchor cells from instantaneous ground height detection, pseudo ground height measurement calculated for each non-anchor cell, and an estimated ground height of the anchor cells and non-anchor cells at a prior timestamp. In some embodiments, the ground height of the anchor cells and the non-anchor cells is estimated based on the at least one other ground height measurement.

A Bayesian filtering framework combines the ground heights of both anchor and non-anchor cells, a pseudo ground-height measurement, and the estimated ground height at time T−1 to produce the a final ground height estimate at the current timestamp T. In some embodiments, when the other ground height measurement is available (such as the ground estimation from other models such as ground elevation prior map and LSN bounding boxes), a Bayesian filtering framework combines the ground heights of both anchor and non-anchor cells, a pseudo ground-height measurement, the other ground height measurement, and the estimated ground height at a previous timestamp (e.g., time T−1) to produce the final ground height estimate at the current timestamp (e.g., time T). At block 1610, the vehicle is operated in accordance with the ground height estimate. In embodiment, the final ground height estimates are output by the Bayesian filtering framework for both anchor cell and non-anchor cells. In some cases, the final ground height estimates of anchor cells may not be the same as the initial ground heights obtained from the instantaneous ground height estimation.

This process flow diagram is not intended to indicate that the blocks of the example process 1600A are to be executed in any particular order, or that all of the blocks are to be included in every case. Further, any number of additional blocks not shown may be included within the example process 1600A, depending on the details of the specific implementation.

Figure 16B:
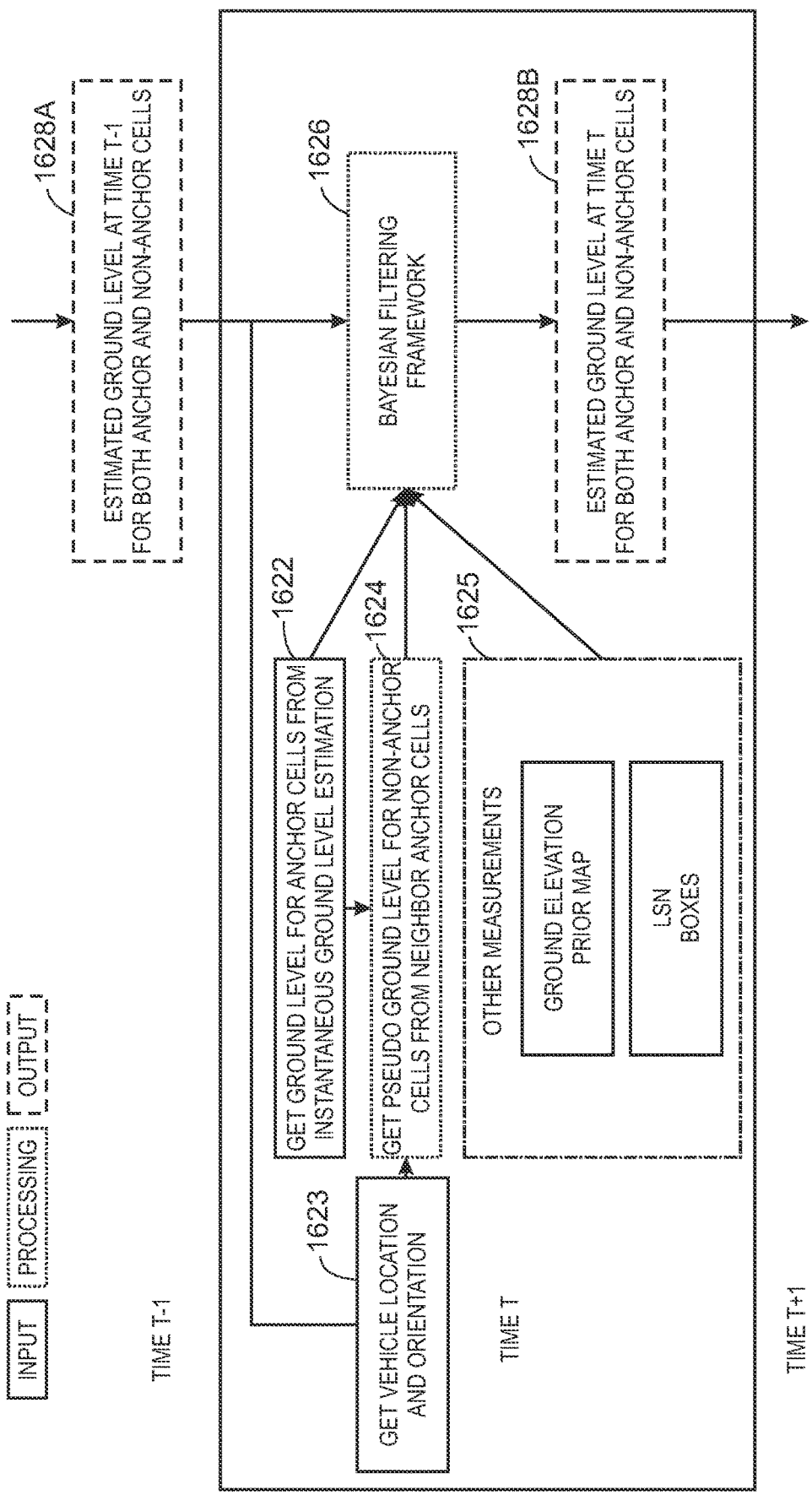
FIG. 16B is a process flow diagram of a process for spatially and temporally consistent ground modelling with information fusion at a plurality of timestamps.

FIG. 16B is a process flow diagram of a process 1600B for spatially and temporally consistent ground modelling with information fusion at a plurality of timestamps. At block 1622, for a timestamp T a ground height for at least one anchor cell is obtained from instantaneous ground height estimation. At block 1624, for a current timestamp T a pseudo ground height measurement associated with non-anchor cells of a grid map of the vehicle is calculated. In an example, the pseudo ground height measurement is determined as described with respect to FIGS. 15A and 15B as described above. Vehicle location and orientation are obtained at block 1623 and used to determine the pseudo ground height measurement.

Block 1628A represents the final ground height estimate output by the Bayesian filtering framework for the previous timestamp T−1. Localization information at block 1623 is used to propagation the final ground height estimates at block 1628A for timestamp T−1 with movement of the vehicle so that when the vehicle moves, the previous estimates are updated correspondingly in the grid map. Thus, the Bayesian filtering framework iteratively updates the ground height measurement for each grid cell across each timestamp.

In some embodiments, at least one other ground height measurement is obtained. Accordingly, when available for the current timestamp T, at block 1625 one or more other ground height measurements are obtained. For example, the at least one other ground height measurement is a ground elevation prior map, LSN bounding boxes, neural network ground detection, or any combination thereof.

At block 1626 for the current timestamp T, a ground height of the anchor cells and the non-anchor cells is estimated based on the ground heights for anchor cells from instantaneous ground height detection, pseudo ground height measurement calculated for each non-anchor cell, and an estimated ground height of the anchor cells and non-anchor cells at a previous timestamp. Block 1628B represents the final ground height estimate output by the Bayesian filtering framework at timestamp T. The final ground height estimate of the anchor cells and the non-anchor cells is propagated at timestamp T+1 based on updated localization information corresponding to vehicle movement. The vehicle is operated in accordance with the final ground height estimates.

This process flow diagram is not intended to indicate that the blocks of the example process 1600B are to be executed in any particular order, or that all of the blocks are to be included in every case. Further, any number of additional blocks not shown may be included within the example process 1600B, depending on the details of the specific implementation.

Figure 17:
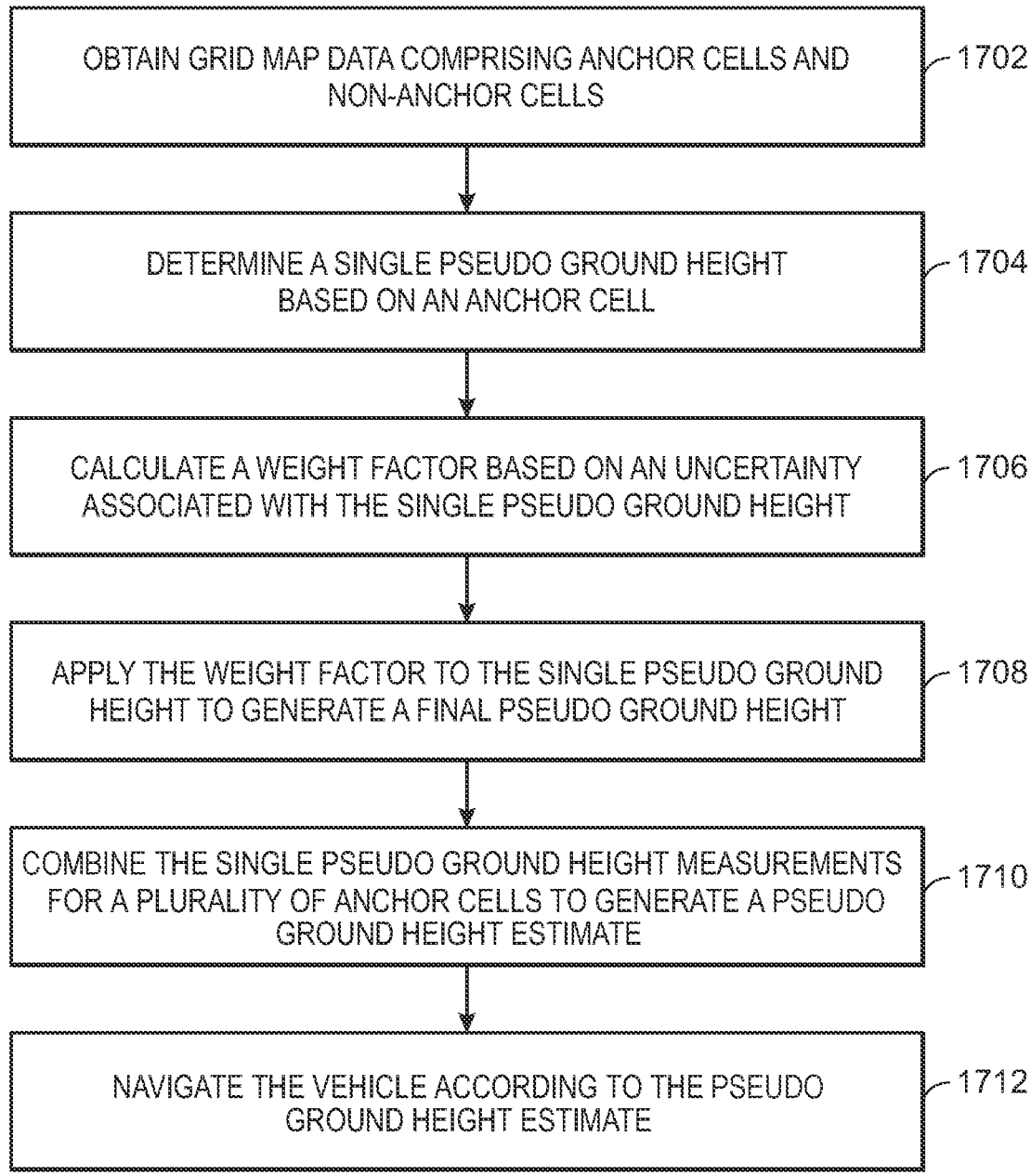
FIG. 17 is a process flow diagram of a process that enables a pseudo ground height measurement.

FIG. 17 is a process flow diagram of a process 1700 that determines a pseudo ground height. At block 1702, grid map data is comprising anchor cells and non-anchor cells is obtained. In an example, the grid map data includes a grid map (e.g., grid map 1500A of FIG. 15A). At block 1704, a single pseudo ground height is determined based on a distance and yaw angle (refer to FIG. 15B) between a nearest neighbor anchor cell and a corresponding non-anchor cell, wherein the single pseudo ground height is associated with an uncertainty (e.g., pseudo measurement uncertainty). At block 1706, a weight factor is calculated based on the uncertainty. At block 1708, the weight factor is applied to the single pseudo ground height measurement corresponding to an anchor cell. At block 1710, the single pseudo ground height measurement corresponding to an anchor cell is combined for a plurality of anchor cells to generate a final, combined pseudo ground height. In pseudo measurement generation, a ground height estimate and a corresponding measure of uncertainty is derived from contextual data extracted from the nearest neighbors to the current non-anchor cell. At block 1712, the vehicle is navigated according to the pseudo ground height estimate.

This process flow diagram is not intended to indicate that the blocks of the example process 1700 are to be executed in any particular order, or that all of the blocks are to be included in every case. Further, any number of additional blocks not shown may be included within the example process 1700, depending on the details of the specific implementation.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method, comprising:
   obtaining, using at least one processor, a vehicle location and orientation in an environment;
   obtaining, using the at least one processor, an instantaneous ground height estimation for anchor cells of a grid map of the vehicle based on the obtained vehicle location and orientation;
   computing, using the at least one processor, a pseudo ground height associated with non-anchor cells of the grid map;
   generating, using the at least one processor, a final ground height estimate for the anchor cells and the non-anchor cells based on the instantaneous ground height estimation for the anchor cells, the pseudo ground height associated with non-anchor cells, an estimated ground height from a previous timestamp, or any combinations thereof; and
   operating, using the at least one processor, the vehicle according to the final ground height estimate.

2. The method of claim 1, comprising:
   obtaining at least one other ground height measurement; and
   generating the final ground height estimate for the anchor cells and the non-anchor cells based on the instantaneous ground height estimation for the anchor cells, the pseudo ground height associated with non-anchor cells, an estimated ground height from a previous timestamp, at least one other ground height measurement, or any combinations thereof.

3. The method of claim 1, wherein computing the pseudo ground height comprises, for each non-anchor cell:
   determining a number of anchor cells that are nearest neighbor anchor cells associated with a non-anchor cell; and
   determining the pseudo ground height of the non-anchor cell based on the ground height of the nearest neighbor anchor cells and a weight factor, the weight factor associated with a distance of the nearest neighbor anchor cells relative to the non-anchor cell.

4. The method of claim 3, wherein the ground height of the nearest neighbor anchor cells is associated with a measurement uncertainty that quantifies a confidence associated with a respective ground height of a nearest neighbor anchor cell.

5. The method of claim 4, wherein the measurement uncertainty of the nearest neighbor anchor cells is used to determine a measurement uncertainty of the non-anchor cell.

6. The method of claim 1, wherein a Bayesian filtering framework iteratively propagates the instantaneous ground height estimation for the anchor cells, the pseudo ground height associated with non-anchor cells, the estimated ground height from a previous timestamp, and at least one other ground height measurement over time with uncertainties using a Kalman filter.

7. The method of claim 2, wherein the at least one other ground height measurement comprises a neural network ground height prediction, a ground elevation prior map, LIDAR bounding box data, or any combinations thereof.

8. The method of claim 1, comprising:
   obtaining a slope associated with anchor cells of a grid map of the vehicle based on the obtained vehicle location and orientation;
   computing a pseudo slope associated with non-anchor cells of the grid map;
   generating a final slope for the anchor cells and the non-anchor cells based on the slope and the pseudo slope; and
   operating the vehicle according to the final slope for the anchor cells and non-anchor cells.

9. The method of claim 1, wherein the final ground height estimate for the anchor cells and the non-anchor cells is spatially and temporally consistent.

10. A method, comprising:
    receiving, using at least one processor of a vehicle, grid map data comprising anchor cells and non-anchor cells;
    receiving, using the at least one processor, a ground height of the anchor cells and the non-anchor cells;
    for the non-anchor cells:
    determining, using the at least one processor, nearest neighbor anchor cells for a non-anchor cell;
    determining, using the at least one processor, a single pseudo ground height for the non-anchor cell based on pseudo ground heights calculated using at least a ground height of each respective nearest neighbor anchor cell, wherein the single pseudo ground height is associated with uncertainties;
    computing, using the at least one processor, at least one weight factor based on the associated uncertainties;
    combining, using the at least one processor, the pseudo ground heights according to the at least one weight factor to generate a final pseudo ground height for the non-anchor cell;
    iteratively filtering, using the at least one processor, an instantaneous ground height estimation and the final pseudo ground height to obtain a final ground height estimate; and
    navigating, using the at least one processor, the vehicle according to the final ground height estimate.

11. The method of claim 10, wherein the weight is a linear interpolation of a distance between an anchor cell and the non-anchor cell.

12. The method of claim 10, wherein a number of nearest neighbor anchor cells is eight.

13. The method of claim 10, wherein iteratively filtering an instantaneous ground height estimation and the final pseudo ground height to obtain a final ground height estimate comprises:

weighting an instantaneous ground height estimation and the final pseudo ground height according to a respective uncertainty, and filtering an instantaneous ground height estimation and the final pseudo ground height based on the weighting using a Kalman filter.

14. A non-transitory computer program product storing instructions that, when executed by at least one programmable processor of a vehicle, cause the at least one programmable computer processor to perform operations comprising:

obtaining a vehicle location and orientation in an environment;

obtaining an instantaneous ground height estimation for anchor cells of a grid map of the vehicle based on the obtained vehicle location and orientation;

computing a pseudo ground height associated with non-anchor cells of the grid map;

generating a final ground height estimate for the anchor cells and the non-anchor cells based on the instantaneous ground height estimation for the anchor cells, the pseudo ground height associated with non-anchor cells, an estimated ground height from a previous timestamp, or any combinations thereof; and operating the vehicle according to the final ground height estimate.

15. The computer program product of claim 14, comprising:

obtaining at least one other ground height measurement; and generating the final ground height estimate for the anchor cells and the non-anchor cells based on the instantaneous ground height estimation for the anchor cells, the pseudo ground height associated with non-anchor cells, an estimated ground height from a previous timestamp, at least one other ground height measurement, or any combinations thereof.

16. The computer program product of claim 14, wherein computing the pseudo ground height comprises, for each non-anchor cell:

determining a number of anchor cells that are nearest neighbor anchor cells associated with a non-anchor cell; and determining the pseudo ground height of the non-anchor cell based on the ground height of the nearest neighbor anchor cells and a weight factor, the weight factor associated with a distance of the nearest neighbor anchor cells relative to the non-anchor cell.

17. The computer program product of claim 14, wherein the ground height of the nearest neighbor anchor cells is associated with a measurement uncertainty that quantifies a confidence associated with a respective ground height of a nearest neighbor anchor cell.

18. The computer program product of claim 17, wherein the measurement uncertainty of the nearest neighbor anchor cells is used to determine a measurement uncertainty of the non-anchor cell.

19. The computer program product of claim 14, wherein a Bayesian filtering framework iteratively propagates the instantaneous ground height estimation for the anchor cells, the pseudo ground height associated with non-anchor cells, the estimated ground height from a previous timestamp, and at least one other ground height measurement over time with uncertainties using a Kalman filter.

20. The computer program product of claim 14, comprising:

obtaining a slope associated with anchor cells of a grid map of the vehicle based on the obtained vehicle location and orientation;

obtaining at least one other slope measurement;

generating a final slope for the anchor cells and the non-anchor cells based on a pseudo slope and the at least one other slope measurement; and operating the vehicle according to the final slope of the anchor cells and non-anchor cells.

* * * * *